(12) United States Patent
Sheng et al.

(10) Patent No.: US 12,355,629 B2
(45) Date of Patent: Jul. 8, 2025

(54) TUNNEL ESTABLISHMENT METHOD, INFORMATION RELEASE METHOD, AND APPARATUS

(71) Applicant: Huawei Technologies Co., Ltd., Shenzhen (CN)

(72) Inventors: Cheng Sheng, Beijing (CN); Tao Tian, Dongguan (CN); Haiyan Jin, Shenzhen (CN); Jianwei Guo, Beijing (CN); Kun Li, Nanjing (CN); Weiheng Huang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 28 days.

(21) Appl. No.: 18/339,792

(22) Filed: Jun. 22, 2023

(65) Prior Publication Data
US 2023/0421450 A1    Dec. 28, 2023

(30) Foreign Application Priority Data

Jun. 23, 2022   (CN) .................. 202210719075.X

(51) Int. Cl.
*H04L 41/12* (2022.01)
*H04L 12/46* (2006.01)
(52) U.S. Cl.
CPC .......... *H04L 41/12* (2013.01); *H04L 12/4633* (2013.01)

(58) Field of Classification Search
CPC .......................... H04L 41/12; H04L 12/4633
See application file for complete search history.

(56) References Cited

U.S. PATENT DOCUMENTS

| | | | |
|---|---|---|---|
| 2014/0086253 A1 | 3/2014 | Yong | |
| 2015/0195105 A1 | 7/2015 | Zhuang et al. | |
| 2017/0331641 A1 | 11/2017 | Fu | |
| 2018/0241823 A1* | 8/2018 | Dawani | ................. H04L 67/141 |
| 2021/0243053 A1 | 8/2021 | Dunbar | |

FOREIGN PATENT DOCUMENTS

JP    2009171056 A    7/2009

\* cited by examiner

*Primary Examiner* — Hua Fan
(74) *Attorney, Agent, or Firm* — SLATER MATSIL, LLP

(57) ABSTRACT

Embodiments of this application disclose a tunnel establishment method. A first communication apparatus may receive first adjacency topology information sent by a second communication apparatus, and establish a first tunnel between the first communication apparatus and the second communication apparatus when the first adjacency topology information matches second adjacency topology information of the first communication apparatus. It can be learned that, in this solution, the first communication apparatus may locally store only the second adjacency topology information of the first communication apparatus. Compared with the conventional technology in which information about two endpoints of a tunnel needs to be configured on the first communication apparatus, configuration for the first communication apparatus is simpler.

20 Claims, 9 Drawing Sheets

TUNNEL ESTABLISHMENT METHOD, INFORMATION RELEASE METHOD, AND APPARATUS

CROSS-REFERENCE TO RELATED APPLICATIONS

This application claims priority to Chinese Patent Application No. 202210719075.X, filed on Jun. 23, 2023, which is hereby incorporated by reference in its entirety.

TECHNICAL FIELD

This application relates to the communication field, and in particular, to a tunnel establishment method, an information release method, and an apparatus.

BACKGROUND

With the development of digitalization and globalization, different sites may have a demand for interconnection. For example, sites such as branches of a same enterprise, campuses, data centers (data center, DC), and clouds have a demand for interconnection in a larger region through a plurality of different wide area networks (wide area network, WAN) of a plurality of service providers. The service provider mentioned herein includes but is not limited to an operator.

Therefore, how to efficiently implement interconnection between sites is a problem to be resolved at present.

SUMMARY

Embodiments of this application provide a tunnel establishment method, an information method, and an apparatus, to quickly and efficiently establish a tunnel between sites, so as to meet a demand for interconnection between the sites.

According to a first aspect, an embodiment of this application provides a tunnel establishment method, and the method may be applied to a first communication apparatus. In an example, the first communication apparatus may receive first adjacency topology information sent by a second communication apparatus, and establish a first tunnel between the first communication apparatus and the second communication apparatus when the first adjacency topology information matches second adjacency topology information of the first communication apparatus. The first adjacency topology information may indicate a tunnel establishment intention of the second communication apparatus, and the second adjacency topology information may indicate a tunnel establishment intention of the first communication apparatus. It can be learned that, in this solution, the first communication apparatus may determine, based on the tunnel establishment intention of the first communication apparatus and the tunnel establishment intention of the second communication apparatus, that a tunnel between the first communication apparatus and the second communication apparatus needs to be established, and further establish the first tunnel between the first communication apparatus and the second communication apparatus. The first communication apparatus may locally store only the second adjacency topology information of the first communication apparatus. Compared with that in the conventional technology in which information about two endpoints of a tunnel needs to be configured on the first communication apparatus, configuration for the first communication apparatus is simpler. When there are a relatively large quantity of sites that need to be interconnected, compared with the conventional technology, this solution can greatly reduce workload of configuring a tunnel endpoint, so that efficiency of establishing a tunnel between sites is improved. In addition, for a plurality of communication apparatuses that have an interconnection requirement, the communication apparatuses may establish tunnels by using the solution provided in this embodiment of this application. After all the foregoing communication apparatuses that have the interconnection requirement establish tunnels by using this solution, these tunnels may form a large interconnection network. The interconnection network can support various network topologies. In the conventional technology, a controller is used for network orchestration, and only a network with a specific topology structure can be orchestrated. This solution can implement flexible networking.

In a possible implementation, the second communication apparatus may use a first control packet to carry the first adjacency topology information, and send the first control packet to the first communication apparatus. In other words, in a specific implementation in which the first communication apparatus receives the first adjacency topology information sent by the second communication apparatus, the first communication apparatus may receive the first control packet that includes the first adjacency topology information and that is sent by the second communication apparatus. The first control packet is not specifically limited in this embodiment of this application. In an example, a new control packet may be redefined. In another example, an existing control packet may be extended, and a new field such as a type length value (type length value, TLV) field may be extended to carry the first adjacency topology information. In another example, a reserved field or another field that has not been used in an existing control packet may be used to carry the first adjacency topology information.

In a possible implementation, the first control packet may be a first border gateway protocol (Border Gateway Protocol, BGP) packet. In this case, the second communication apparatus may send the first adjacency topology information to the first communication apparatus by using the first BGP packet.

In a possible implementation, the first BGP packet is used to advertise a first BGP route. In other words, the first BGP packet may carry the first BGP route. In this case, by sending the first BGP packet to the first communication apparatus, the second communication apparatus not only advertises the BGP route to the first communication apparatus, but also transfers the first adjacency topology information to the first communication apparatus.

In a possible implementation, considering that both the first communication apparatus and the second communication apparatus may be configured with an Ethernet virtual private network (Ethernet virtual private network, EVPN) service, the first BGP route may be a first BOP EVPN route.

In a possible implementation, the first adjacency topology information may include a first adjacency type and a first adjacency identifier (identifier, ID). The first adjacency type may indicate a type of a connection between the second communication apparatus and another communication apparatus.

In an example, the first adjacency identifier indicates the second communication apparatus to perform specific tunnel establishment behavior. In an example, the first adjacency type is point-to-point or full mesh, and the first adjacency ID indicates the second communication apparatus to establish a point-to-point tunnel between the second communication apparatus and a communication apparatus whose corresponding adjacency type is the first adjacency type and whose corresponding adjacency ID is the first adjacency ID. In another example, when the first adjacency type is point-to-multipoint, the first adjacency ID indicates the second communication apparatus to establish a point-to-point tunnel between a hub (hub) node and a spoke (spoke) node.

In another example, a meaning of the first adjacency identifier may be determined based on the first adjacency type, and the tunnel establishment intention of the second communication apparatus may be determined by using the first adjacency type and the first adjacency identifier. In an example, when the first adjacency type is point-to-point, the first adjacency ID indicates a point-to-point connection between the second communication apparatus and another communication apparatus. When the first adjacency type is full mesh, the first adjacency ID indicates a full mesh network in which the second communication apparatus is located. When the first adjacency type is point-to-multipoint, the first adjacency ID indicates the hub node.

In a possible implementation, similar to the first adjacency topology information, the second adjacency topology information may also include the first adjacency type and the first adjacency identifier. The first adjacency type may indicate a type of a connection between the first communication apparatus and another communication apparatus.

In an example, the first adjacency identifier indicates the first communication apparatus to perform specific tunnel establishment behavior. In an example, the first adjacency type is point-to-point or full mesh, and the first adjacency ID indicates the first communication apparatus to establish a point-to-point tunnel between the first communication apparatus and a communication apparatus whose corresponding adjacency type is the first adjacency type and whose corresponding adjacency ID is the first adjacency ID. In another example, when the first adjacency type is point-to-multipoint, the first adjacency ID indicates the first communication apparatus to establish a point-to-point tunnel between a hub node and a spoke node.

In another example, a meaning of the first adjacency identifier may be determined based on the first adjacency type, and the tunnel establishment intention of the first communication apparatus may be determined by using the first adjacency type and the first adjacency identifier. In an example, when the first adjacency type is point-to-point, the first adjacency ID indicates a point-to-point connection between the first communication apparatus and another communication apparatus. When the first adjacency type is full mesh, the first adjacency ID indicates a full mesh network in which the first communication apparatus is located. When the first adjacency type is point-to-multipoint, the first adjacency ID indicates the hub node.

In a possible implementation, an adjacency type and an adjacency identifier included in the first adjacency topology information may reflect the tunnel establishment intention of the second communication apparatus, and an adjacency type and an adjacency identifier included in the second adjacency topology information may reflect the tunnel establishment intention of the first communication apparatus. Therefore, when the first adjacency topology information and the second adjacency topology information include a same adjacency type and a same adjacency ID, it may indicate that the tunnel establishment intention of the second communication apparatus matches the tunnel establishment intention of the first communication apparatus. Therefore, in an example, that the first adjacency topology information matches the second adjacency topology information of the first communication apparatus may be that the first adjacency topology information and the second adjacency topology information include a same adjacency type and a same adjacency ID. Correspondingly, when the first adjacency topology information and the second adjacency topology information include the same adjacency type and the same adjacency ID, it may be determined that the tunnel establishment intention of the second communication apparatus matches the tunnel establishment intention of the first communication apparatus. Further, the first communication apparatus may establish the first tunnel between the first communication apparatus and the second communication apparatus.

In a possible implementation, for a network, after the network is split, a connection relationship between nodes in the network may include: point-to-point, point-to-multipoint, and full mesh. Therefore, in an example, the foregoing first connection type may include one of point-to-point, point-to-multipoint, and full mesh.

In a possible implementation, when the first adjacency type is point-to-multipoint, and the first adjacency identifier is used to identify a hub node, if the first communication apparatus is a hub node, after receiving the first adjacency topology information sent by the second communication apparatus, the first communication apparatus determines that the first adjacency type is point-to-multipoint, and the first adjacency identifier is used to identify the first communication apparatus. In this case, the first communication apparatus may establish a tunnel between a node of the first communication apparatus (hub) and a node of the second communication apparatus (spoke). If the first communication apparatus is a spoke node, after receiving the first adjacency topology information sent by the second communication apparatus, the first communication apparatus determines that the first adjacency type is point-to-multipoint, and the first adjacency identifier is used to identify the second communication apparatus. In this case, the first communication apparatus may establish a tunnel between a node of the first communication apparatus (spoke) and a node of the second communication apparatus (hub). If the first communication apparatus is a spoke node, after receiving the first adjacency topology information sent by the second communication apparatus, the first communication apparatus determines that the first adjacency type is point-to-multipoint, and the first adjacency identifier is neither used to identify the second communication apparatus nor used to identify the first communication apparatus. In this case, it indicates that both the second communication apparatus and the first communication apparatus are spoke nodes, and the first communication apparatus does not need to establish a tunnel between the second communication apparatus and the first communication apparatus.

In a possible implementation, when the first adjacency type is point-to-multipoint, both the first communication apparatus and the second communication apparatus cannot be spoke nodes. In an example, the first communication apparatus is the hub node, and the second communication apparatus is the spoke node. In another example, the first communication apparatus is the spoke node, and the second communication apparatus is the hub node.

In a possible implementation, in addition to receiving the first adjacency topology information sent by the second communication apparatus, the first communication apparatus may further receive adjacency topology information sent by another communication apparatus, and determine whether to establish a tunnel with the another communication apparatus. In an example, the first communication apparatus may further receive third adjacency topology information sent by a third communication apparatus; and establish a second tunnel between the first communication apparatus and the third communication apparatus when the third adjacency topology information matches the second adjacency topology information.

In a possible implementation, the first communication apparatus may further send the second adjacency topology information to the second communication apparatus, so that the second communication apparatus establishes a tunnel between the first communication apparatus and the second communication apparatus when the first topology information matches the second topology information.

In a possible implementation, the sending the second adjacency topology information to the second communication apparatus includes: sending a second control packet to the second communication apparatus, where the second control packet includes the second adjacency topology information.

In a possible implementation, the second control packet is a second BGP packet.

In a possible implementation, the second BGP packet route is used to advertise a second BGP route.

In a possible implementation, the second BGP route is a second BGP EVPN route.

In a possible implementation, the second adjacency topology information may be preconfigured on the first communication apparatus. In this case, the first communication apparatus may obtain the locally preconfigured second adjacency topology information, and send the second adjacency topology information to the second communication apparatus.

In a possible implementation, the second adjacency topology information may be sent by a controller to the first communication apparatus. After receiving the second adjacency topology information sent by the controller, the first communication apparatus may store the second adjacency topology information. In this case, the first communication apparatus may obtain the stored second adjacency topology information, and send the second adjacency topology information to the second communication apparatus.

According to a second aspect, an embodiment of this application provides an information release method. The method may be applied to a second communication apparatus. In an example, the second communication apparatus may obtain first adjacency topology information of the second communication apparatus, and send the first adjacency topology information to a first communication apparatus. The first adjacency topology information may indicate a tunnel establishment intention of the second communication apparatus. Correspondingly, in an example, after receiving the first adjacency topology information, the first communication apparatus may match the tunnel establishment intention indicated by the first adjacency topology information with a tunnel establishment intention of the first communication apparatus. When the tunnel establishment intentions match, the first communication apparatus may establish a first tunnel between the first communication apparatus and the second communication apparatus. The first communication apparatus may locally store only information (that is, second adjacency topology information) for indicating the tunnel establishment intention of the first communication apparatus. Compared with that in the conventional technology in which information about two endpoints of a tunnel needs to be configured on the first communication apparatus, configuration for the first communication apparatus is simpler. When there are a relatively large quantity of sites that need to be interconnected, compared with the conventional technology, this solution can greatly reduce workload of configuring a tunnel endpoint, so that efficiency of establishing a tunnel between sites is improved. In addition, for a plurality of communication apparatuses that have an interconnection requirement, the communication apparatuses may establish tunnels by using the solution provided in this embodiment of this application. After all the foregoing communication apparatuses that have the interconnection requirement establish tunnels by using this solution, these tunnels may form a large interconnection network. The interconnection network can support various network topologies. In the conventional technology, a controller is used for network orchestration, and only a network with a specific topology structure can be orchestrated. This solution can implement flexible networking.

In a possible implementation, the first adjacency topology information may be preconfigured on the second communication apparatus. In this case, the second communication apparatus may obtain the locally preconfigured first adjacency topology information, and send the first adjacency topology information to the first communication apparatus.

In a possible implementation, the first adjacency topology information may be sent by a controller to the second communication apparatus. After receiving the first adjacency topology information sent by the controller, the second communication apparatus may store the first adjacency topology information. In this case, the second communication apparatus may obtain the stored first adjacency topology information, and send the first adjacency topology information to the first communication apparatus.

In a possible implementation, the sending the first adjacency topology information to a first communication apparatus includes: sending a first control packet to the first communication apparatus, where the first control packet includes the first adjacency topology information.

In a possible implementation, the first control packet is a first border gateway protocol BGP packet.

In a possible implementation, the first BGP packet is used to advertise a first border gateway protocol BGP route.

In a possible implementation, the first BGP route is a first BGP Ethernet virtual private network EVPN route.

In a possible implementation, the method further includes: receiving second adjacency topology information sent by the first communication apparatus.

In a possible implementation, the receiving second adjacency topology information sent by the first communication apparatus includes: receiving a second control packet sent by the first communication apparatus, where the second control packet includes the second adjacency topology information.

In a possible implementation, the second control packet is a second BGP packet.

In a possible implementation, the second BGP packet route is used to advertise a second BOP route.

In a possible implementation, the second BOP route is a second BGP EVPN route.

In a possible implementation, the method further includes: establishing a tunnel between the first communication apparatus and the second communication apparatus when the first adjacency topology information matches the second adjacency topology information.

In a possible implementation, the first adjacency topology information includes: a first adjacency type and a first adjacency identifier ID.

In a possible implementation, the second adjacency topology information includes: the first adjacency type and the first adjacency ID.

In a possible implementation, that the first adjacency topology information matches the second adjacency topology information of the first communication apparatus includes: the first adjacency topology information and the second adjacency topology information include a same adjacency type and a same adjacency ID.

In a possible implementation, the first adjacency type includes any one of the following: point-to-point, point-to-multipoint, or full mesh.

In a possible implementation, the first adjacency type is point-to-point or full mesh, and the first adjacency ID indicates the second communication apparatus to establish a point-to-point tunnel between the second communication apparatus and a communication apparatus whose corresponding adjacency relationship type is the first adjacency type and whose corresponding adjacency ID is the first adjacency ID. Alternatively, when the first adjacency type is point-to-point, the first adjacency ID indicates a point-to-point connection between the second communication apparatus and another communication apparatus; or when the first adjacency type is full mesh, the first adjacency ID indicates a full mesh network in which the second communication apparatus is located.

In a possible implementation, the first adjacency type is point-to-multipoint, and the first adjacency ID indicates the second communication apparatus to establish a point-to-point tunnel between a spoke spoke node and a hub hub node.

In a possible implementation, the first communication apparatus is the hub node, and the second communication apparatus is the spoke node, or the first communication apparatus is the spoke node, and the second communication apparatus is the hub node.

In a possible implementation, the first adjacency ID identifies the hub node.

According to a third aspect, an embodiment of this application provides a first communication apparatus. The first communication apparatus includes a transceiver unit and a processing unit. The transceiver unit is configured to perform a receiving-related operation and/or a sending-related operation performed by the first communication apparatus in the first aspect and the possible implementations of the first aspect. The processing unit is configured to perform an operation other than the receiving-related operation and/or the sending-related operation performed by the first communication apparatus in the first aspect and the possible implementations of the first aspect. In specific implementation, the transceiver unit may include a receiving unit and/or a sending unit. The receiving unit is configured to perform the receiving-related operation, and the sending unit is configured to perform the sending-related operation.

In a specific example, the first communication apparatus may include the receiving unit and the processing unit.

The receiving unit is configured to receive first adjacency topology information sent by a second communication apparatus. The processing unit is configured to establish a first tunnel between the first communication apparatus and the second communication apparatus when the first adjacency topology information matches second adjacency topology information of the first communication apparatus.

In a possible implementation, the receiving unit is configured to receive a first control packet sent by the second communication apparatus, where the first control packet includes the first adjacency topology information.

In a possible implementation, the first control packet is a first border gateway protocol BGP packet.

In a possible implementation, the first BGP packet is used to advertise a first border gateway protocol BGP route.

In a possible implementation, the first BGP route is a first BGP Ethernet virtual private network EVPN route.

In a possible implementation, the first adjacency topology information includes: a first adjacency type and a first adjacency identifier ID.

In a possible implementation, the second adjacency topology information includes: the first adjacency type and the first adjacency ID.

In a possible implementation, that the first adjacency topology information matches the second adjacency topology information of the first communication apparatus includes: the first adjacency topology information and the second adjacency topology information include a same adjacency type and a same adjacency ID.

In a possible implementation, the first adjacency type includes any one of the following: point-to-point, point-to-multipoint, or full mesh.

In a possible implementation, the first adjacency type is point-to-point or full mesh, and the first adjacency ID indicates the first communication apparatus to establish a point-to-point tunnel between the first communication apparatus and a communication apparatus whose corresponding adjacency type is the first adjacency type and whose corresponding adjacency ID is the first adjacency ID. Alternatively, when the first adjacency type is point-to-point, the first adjacency ID indicates a point-to-point connection between the first communication apparatus and another communication apparatus; or when the first adjacency type is full mesh, the first adjacency ID indicates a full mesh network in which the first communication apparatus is located.

In a possible implementation, the first adjacency type is point-to-multipoint, and the first adjacency ID indicates the first communication apparatus to establish a point-to-point tunnel between a spoke spoke node and a hub hub node.

In a possible implementation, the first communication apparatus is the hub node, and the second communication apparatus is the spoke node, or the first communication apparatus is the spoke node, and the second communication apparatus is the hub node.

In a possible implementation, the first adjacency ID identifies the hub node.

In a possible implementation, the receiving unit is further configured to receive third adjacency topology information sent by a third communication apparatus. The processing unit is further configured to establish a second tunnel between the first communication apparatus and the third communication apparatus when the third adjacency topology information matches the second adjacency topology information.

In a possible implementation, the apparatus further includes: a sending unit, configured to send the second adjacency topology information to the second communication apparatus.

In a possible implementation, the sending unit is configured to send a second control packet to the second communication apparatus, where the second control packet includes the second adjacency topology information.

In a possible implementation, the second control packet is a second BGP packet.

In a possible implementation, the second BGP packet route is used to advertise a second BGP route.

In a possible implementation, the second BGP route is a second BOP EVPN route.

In a possible implementation, the processing unit is further configured to locally preconfigure the second adjacency topology information.

In a possible implementation, the receiving unit is further configured to receive the second adjacency topology information sent by a controller.

According to a fourth aspect, an embodiment of this application provides a second communication apparatus. The second communication apparatus includes a transceiver unit and a processing unit. The transceiver unit is configured to perform a receiving-related operation and/or a sending-related operation performed by the second communication apparatus in the second aspect and the possible implementations of the second aspect. The processing unit is configured to perform an operation other than the receiving-related operation and/or the sending-related operation performed by the second communication apparatus in the second aspect and the possible implementations of the second aspect. In specific implementation, the transceiver unit may include a receiving unit and/or a sending unit. The receiving unit is configured to perform the receiving-related operation, and the sending unit is configured to perform the sending-related operation.

In a specific example, the second communication apparatus may include the processing unit and the sending unit.

The processing unit is configured to obtain first adjacency topology information of the second communication apparatus. The sending unit is configured to send the first adjacency topology information to a first communication apparatus.

In a possible implementation, the processing unit is configured to obtain the first adjacency topology information preconfigured on the second communication apparatus locally.

In a possible implementation, the processing unit is configured to receive the first adjacency topology information sent by a controller.

In a possible implementation, the sending unit is configured to send a first control packet to the first communication apparatus, where the first control packet includes the first adjacency topology information.

In a possible implementation, the first control packet is a first border gateway protocol BGP packet.

In a possible implementation, the first BGP packet is used to advertise a first border gateway protocol BGP route.

In a possible implementation, the first BOP route is a first BGP Ethernet virtual private network EVPN route.

In a possible implementation, the apparatus further includes: a receiving unit, configured to receive second adjacency topology information sent by the first communication apparatus.

In a possible implementation, the receiving unit is configured to receive a second control packet sent by the first communication apparatus, where the second control packet includes the second adjacency topology information.

In a possible implementation, the second control packet is a second BGP packet.

In a possible implementation, the second BGP packet route is used to advertise a second BGP route.

In a possible implementation, the second BGP route is a second BGP EVPN route.

In a possible implementation, the processing unit is further configured to establish a tunnel between the first communication apparatus and the second communication apparatus when the first adjacency topology information matches the second adjacency topology information.

In a possible implementation, the first adjacency topology information includes: a first adjacency type and a first adjacency identifier ID.

In a possible implementation, the second adjacency topology information includes: the first adjacency type and the first adjacency ID.

In a possible implementation, that the first adjacency topology information matches the second adjacency topology information of the first communication apparatus includes: the first adjacency topology information and the second adjacency topology information include a same adjacency type and a same adjacency ID.

In a possible implementation, the first adjacency type includes any one of the following: point-to-point, point-to-multipoint, or full mesh.

In a possible implementation, the first adjacency type is point-to-point or full mesh, and the first adjacency ID indicates the second communication apparatus to establish a point-to-point tunnel between the second communication apparatus and a communication apparatus whose corresponding adjacency relationship type is the first adjacency type and whose corresponding adjacency ID is the first adjacency ID. Alternatively, when the first adjacency type is point-to-point, the first adjacency ID indicates a point-to-point connection between the second communication apparatus and another communication apparatus; or when the first adjacency type is full mesh, the first adjacency ID indicates a full mesh network in which the second communication apparatus is located.

In a possible implementation, the first adjacency type is point-to-multipoint, and the first adjacency ID indicates the second communication apparatus to establish a point-to-point tunnel between a spoke spoke node and a hub hub node.

In a possible implementation, the first communication apparatus is the hub node, and the second communication apparatus is the spoke node, or the first communication apparatus is the spoke node, and the second communication apparatus is the hub node.

In a possible implementation, the first adjacency ID identifies the hub node.

According to a fifth aspect, this application provides a communication apparatus. The communication apparatus includes a memory and a processor. The memory is configured to store program code. The processor is configured to run instructions in the program code, so that the communication apparatus performs the method according to any one of the first aspect and the possible implementations of the first aspect, or the communication apparatus performs the method according to any one of the second aspect and the possible implementations of the second aspect.

According to a sixth aspect, this application provides a communication apparatus. The communication apparatus includes a communication interface and a processor, and the communication interface and the processor are used to enable the communication apparatus to perform some or all operations in the method according to any one of the foregoing aspects and any implementation of the method according to any one of the foregoing aspects. In a specific implementation, the communication interface is configured to perform a receiving/sending operation performed by the communication apparatus in any one of the first aspect and the possible implementations of the first aspect, and the processor is configured to perform another operation other than the receiving/sending operation performed by the communication apparatus in any one of the first aspect and the possible implementations of the first aspect. Alternatively, the communication interface is configured to perform a receiving/sending operation performed by the communication apparatus in any one of the second aspect and the possible implementations of the second aspect, and the processor is configured to perform another operation other than the receiving/sending operation performed by the communication apparatus in any one of the second aspect and the possible implementations of the second aspect.

According to a seventh aspect, an embodiment of this application provides a computer-readable storage medium, including instructions or a computer program. When the instructions or the computer program are/is run on a processor, the method according to any one of the possible implementations of the first aspect or the method according to any one of the possible implementations of the second aspect is performed.

According to an eighth aspect, an embodiment of this application provides a computer program product, including a computer program product. When the computer program product runs on a processor, the method according to any one of the first aspect and the possible implementations of the first aspect or the method according to any one of the second aspect and the possible implementations of the second aspect is performed.

According to a ninth aspect, an embodiment of this application provides a communication system. The communication system includes: a first communication apparatus for performing the method according to any one of the first aspect and the possible implementations of the first aspect, and a second communication apparatus for performing the method according to any one of the second aspect and the possible implementations of the second aspect.

BRIEF DESCRIPTION OF DRAWINGS

To describe the technical solutions in embodiments of this application or the conventional technology more clearly, the following briefly describes the accompanying drawings for describing the embodiments or the conventional technology. It is clear that, the accompanying drawings in the following description show only some embodiments recorded in this application, and a person of ordinary skill in the art may still derive other drawings from these accompanying drawings without creative efforts.

DESCRIPTION OF EMBODIMENTS

Embodiments of this application provide a tunnel establishment method, an information release method, and an apparatus, to efficiently implement interconnection between sites.

For ease of understanding, a possible application scenario of embodiments of this application is first described.

Figure 1A:
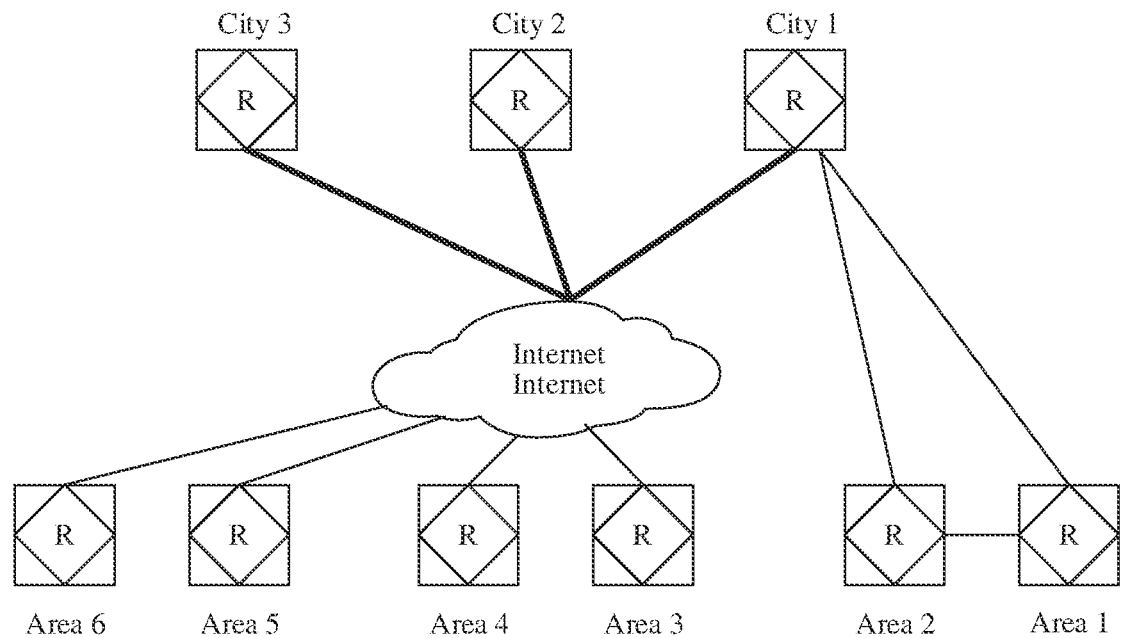
FIG. 1a is a schematic diagram of an example application scenario according to an embodiment of this application.

FIG. 1a is a schematic diagram of an example application scenario according to an embodiment of this application.

In the scenario shown in FIG. 1a, details are as follows.

Every two of three sites: an area 2, an area 1, and a city 1, are interconnected through a point-to-point private line.

All sites other than two sites: the area 2 and the area 1, are interconnected through the Internet (internet). In the sites interconnected through the Internet, three sites: a city 3, a city 2, and the city 1, are interconnected through high-bandwidth private lines, and the other sites are interconnected through low-bandwidth wide area lines.

Figure 1B:
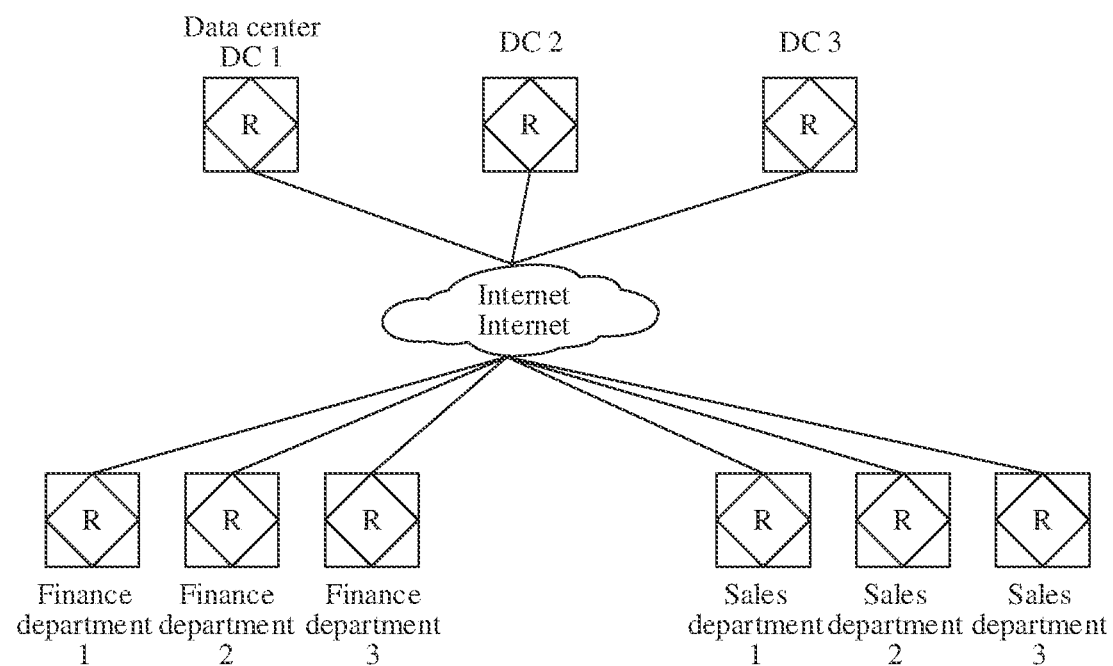
FIG. 1b is a schematic diagram of another example application scenario according to an embodiment of this application.

FIG. 1b is a schematic diagram of another example application scenario according to an embodiment of this application.

In the scenario shown in FIG. 1b, details are as follows.

For a company with a plurality of offices, three data centers: a DC 1, a DC 2, and a DC 3, exist in three places, and there are three finance departments and three sales departments deployed in different places. Nine sites: the DC 1, the DC 2, the DC 3, the three finance departments, and the three sales departments shown in FIG. 1b, are all connected through the Internet.

In an example, the sites may be sequentially configured, to implement a demand for interconnection between the sites. Specifically, for a tunnel, when a site corresponding to either end of the tunnel is configured, information about sites corresponding to two ends of the tunnel needs to be configured. For example, for a tunnel between the site "city 1" and the site "area 2", when the site "city 1" is configured, information corresponding to the site "city 1" and information corresponding to the site "area 2" need to be configured. In this manner, site configuration is complex. When a large quantity of sites need to be configured, configuration workload is heavy and efficiency is low.

In another example, a controller may be used to perform orchestration to implement a demand for interconnection between sites. In an example, an interconnection network shown in FIG. 1a or FIG. 1b may be modeled, the network is abstracted into several common network topologies, and then a user specifies, on a controller, a topology type to which each site belongs and a role of the site in a topology. The controller performs automatic orchestration for conversion into tunnel configuration of each site based on the topology type to which each site belongs and role of the site in the topology.

Common network topologies may include: a hub (hub) spoke (spoke) topology, a full mesh (full mesh) topology, a hierarchical topology, and the like. For the hub spoke topology, it should be noted that, each spoke node interacts with a spoke node, and spoke nodes do not exchange data. For the full mesh topology, it should be noted that, any two sites in the full mesh topology can exchange data.

However, in actual application, there is a scenario in which flexible networking is required. However, in the manner in which a controller is used for orchestration, only a network with a specific topology structure can be orchestrated, and a flexible networking requirement cannot be met.

In view of this, embodiments of this application provide a tunnel establishment method, an information release method, and an apparatus, to efficiently implement interconnection between sites, and meet a flexible networking requirement.

It should be noted that, FIG. 1a and FIG. 1b show merely two scenarios to which this solution is applicable. A scenario to which the solution provided in embodiments of this application is applicable is not limited to the scenarios shown in FIG. 1a and FIG. 1b.

The site mentioned in embodiments of this application may correspond to a network area, for example, may correspond to a campus, a DC, or a branch. Sites may be interconnected by using customer-premises equipment (customer-premises equipment, CPE) of the sites.

Figure 2:
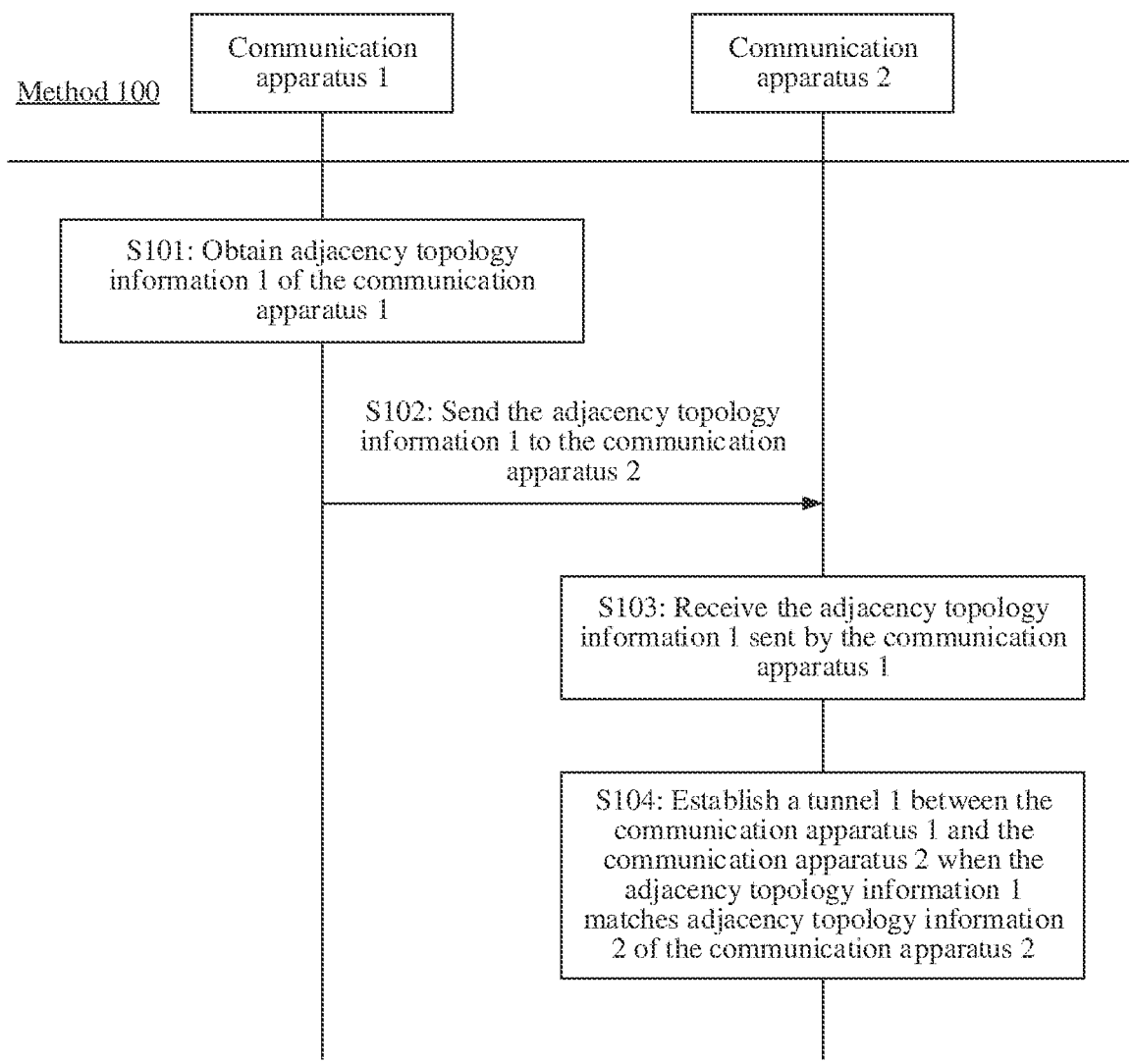
FIG. 2 is a signaling interaction diagram of a tunnel establishment method according to an embodiment of this application.

With reference to FIG. 2, the following describes a tunnel establishment method provided in an embodiment of this application. FIG. 2 is a signaling interaction diagram of a tunnel establishment method according to an embodiment of this application.

Before the method 100 shown in FIG. 2 is described, the following needs to be noted.

A communication apparatus mentioned in embodiments of this application (for example, a communication apparatus 1 or a communication apparatus 2 mentioned below) may be a network device such as a switch or a router, or may be a component on the network device, for example, a board or a line card on the network device, or may be a function module on the network device, or may be a chip configured to implement the method in this application. This is not specifically limited in embodiments of this application. Communication apparatuses may be directly connected, for example, but not limited to, by using an Ethernet cable or an optical cable.

In an example, the communication apparatus may correspond to a site, for example, CPE of the site. The CPE of the site corresponding to the communication apparatus means: The communication apparatus may be the CPE, or may be a component on the CPE.

A communication apparatus 1 in the method 100 may correspond to CPE of any site shown in FIG. 1a. Correspondingly, a communication apparatus 2 may correspond to CPE of any other site shown in FIG. 1a that has a demand for interconnection with the communication apparatus 1.

Alternatively, a communication apparatus 1 in the method 100 may correspond to CPE of any site shown in FIG. 1b. Correspondingly, a communication apparatus 2 may correspond to CPE of any other site shown in FIG. 1b that has a demand for interconnection with the communication apparatus 1.

In addition, a tunnel mentioned in embodiments of this application may be referred to as an overlay tunnel. The overlay tunnel may be a tunnel established based on a tunnel provided by a service provider. The tunnel provided by the service provider may correspond to a physical link, and the overlay tunnel is unaware of the physical link. The overlay tunnel includes but is not limited to a virtual extensible local area network (virtual extensible local area network, VXLAN) tunnel, a generic routing encapsulation (generic routing encapsulation, GRE) tunnel, and an internet protocol security (Internet Protocol Security, IPSec)-based GRE tunnel. The IPSec-based GRE tunnel may also be referred to as a GRE over IPsec tunnel.

The method 100 shown in FIG. 2 may include, for example, the following S1M to S104.

S101: The communication apparatus 1 obtains adjacency topology information 1 of the communication apparatus 1.

In this embodiment of this application, the adjacency topology information 1 may indicate a tunnel establishment intention of the communication apparatus 1. The tunnel establishment intention may be understood as an intention of establishing a tunnel. The tunnel establishment intention of the communication apparatus 1 may indicate an intention of establishing a tunnel between the communication apparatus 1 and another communication apparatus.

In an example, the adjacency topology information 1 may be preconfigured on the communication apparatus 1 locally. In this case, the communication apparatus 1 may obtain the adjacency topology information 1 that is preconfigured locally.

In another example, the adjacency topology information 1 may be delivered by a controller to the communication apparatus 1. In this case, the communication apparatus 1 may receive the adjacency topology information 1 sent by the controller.

In an example, the adjacency topology information 1 may include an adjacency type 1 and an adjacency identifier 1, the adjacency type 1 may indicate a type of a connection between the communication apparatus 1 and another communication apparatus, and the adjacency identifier 1 indicates the communication apparatus 1 to perform specific tunnel establishment behavior. For the tunnel establishment behavior indicated by the adjacency identifier 1, the following needs to be noted.

In an example, when the adjacency type 1 is point-to-point or full mesh, the adjacency identifier 1 in the adjacency topology information 1 indicates the communication apparatus 1 to establish a point-to-point tunnel between the communication apparatus 1 and a communication apparatus whose corresponding adjacency type is the adjacency type 1 and whose corresponding adjacency ID is the adjacency identifier 1. For example, when the adjacency type 1 is point-to-point, the adjacency identifier 1 in the adjacency topology information 2 indicates the communication apparatus 1 to establish a point-to-point tunnel between the communication apparatus 1 and a communication apparatus whose corresponding adjacency type is point-to-point and whose corresponding adjacency ID is the adjacency identifier 1. For another example, when the adjacency type 1 is full mesh, the adjacency identifier 1 in the adjacency topology information 1 indicates the communication apparatus 1 to establish a point-to-point tunnel between the communication apparatus 1 and a communication apparatus whose corresponding adjacency type is full mesh and whose corresponding adjacency ID is the adjacency identifier 1.

In another example, when the adjacency type 1 is point-to-multipoint, the adjacency identifier 1 indicates the communication apparatus 1 to establish a point-to-point tunnel between a spoke node and a hub node. In this case, the communication apparatus 1 may be the hub node or the spoke node. This is not specifically limited in this embodiment of this application.

In another example, the adjacency type 1 may indicate a type of a connection between the communication apparatus 1 and another communication apparatus. A meaning of the adjacency identifier 1 is determined based on the connection type indicated by the adjacency type 1. In an example, when the adjacency type 1 is point-to-point, the adjacency identifier 1 indicates a point-to-point connection between the communication apparatus 1 and another communication apparatus. In another example, when the adjacency type 1 is full mesh, the adjacency identifier 1 indicates a full-mesh network in which the communication apparatus 1 is located. In another example, when the adjacency type 1 is point-to-multipoint, the adjacency identifier 1 is used to identify a hub node.

In this embodiment of this application, for a network, after the network is split, a connection relationship between nodes in the network may include: point-to-point, point-to-multipoint, and full mesh. Therefore, in an example, abstract modeling may be performed on a type of a connection between nodes, and the type of the connection between the nodes is abstracted as point-to-point, point-to-multipoint, and full mesh. In other words, the foregoing connection type 1 may include one of point-to-point, point-to-multipoint, and full mesh.

S102: The communication apparatus 1 sends the adjacency topology information 1 to the communication apparatus 2.

S103: The communication apparatus 2 receives the adjacency topology information 1 sent by the communication apparatus 1.

After obtaining the adjacency topology information 1, the communication apparatus 1 may send the adjacency topology information 1 to the communication apparatus 2. Correspondingly, the communication apparatus 2 may receive the adjacency topology information 1 sent by the communication apparatus 1. In an example, the communication apparatus 1 may directly send the adjacency topology information 1 to the communication apparatus 2, or the communication apparatus 1 may send the adjacency topology information 1 to the communication apparatus 2 through another device. This is not specifically limited in this embodiment of this application. In an example, the communication apparatus 1 may send the adjacency topology information 1 to the communication apparatus 2 through a route reflector (route reflector, RR).

In an example, the communication apparatus 1 may use a control packet 1 to carry the adjacency topology information 1, and send the control packet 1 to the communication apparatus 2. The control packet 1 is not specifically limited in this embodiment of this application. For example, a new control packet may be redefined, and the adjacency topology information 1 is carried in the new control packet and sent to the communication apparatus 2. For another example, an existing control packet may be extended, and a new field (for example, TLV) may be extended to carry the adjacency topology information 1. For another example, a reserved field or another field that has not been used in an existing control packet may be used to carry the adjacency topology information 1.

In an example, the control packet 1 may be a BOP packet 1. In this case, in an example, the BGP packet may be extended, and a new extended community attribute may be extended to carry the adjacency topology information 1. In this manner, the communication apparatus 1 may send the adjacency topology information 1 to the communication apparatus 2 by using the BGP packet 1.

In an example, the BGP packet 1 may be used to advertise a BGP route 1. In other words, the BGP packet 1 may carry the BGP route. In this case, by sending the BGP packet 1 to the communication apparatus 2, the communication apparatus 1 not only advertises the BGP route to the communication apparatus 2, but also transfers the adjacency topology information 1 to the communication apparatus 2. The BGP route 1 is not specifically limited in this embodiment of this application. In an example, considering that an EVPN service may be configured for both the communication apparatus 1 and the communication apparatus 2, the BOP route 1 may be a BGP EVPN route 1.

S104: The communication device 2 establishes a tunnel 1 between the communication apparatus 1 and the communication apparatus 2 when the adjacency topology information 1 matches adjacency topology information 2 of the communication apparatus 2. After receiving the adjacency topology information sent by the communication apparatus 1, the communication apparatus 2 may match the received adjacency topology information with the adjacency topology information 2 of the communication apparatus 2, to determine whether the tunnel establishment intention of the communication apparatus 1 matches a tunnel establishment intention of the communication apparatus 2. The adjacency topology information 2 indicates the tunnel establishment intention of the communication apparatus 2. If the tunnel establishment intention of the communication apparatus 1 matches the tunnel establishment intention of the communication apparatus 2, the communication apparatus 2 may establish the tunnel 1 between the communication apparatus 1 and the communication apparatus 2.

The adjacency topology information 2 of the communication apparatus 2 is similar to the adjacency topology information 1 of the communication apparatus 1. The adjacency topology information of the communication apparatus 2 may be preconfigured on the communication apparatus 2 locally, or may be sent by the controller to the communication apparatus 2. In an example, the communication apparatus 2 may locally preconfigure the adjacency topology information 2, or the communication apparatus 2 may receive the adjacency topology information sent by the controller.

In this embodiment of this application, when the adjacency topology information 1 matches the adjacency topology information 2, it may be determined that the tunnel establishment intention of the communication apparatus 1 matches the tunnel establishment intention of the communication apparatus 2.

As described above, in an example, the adjacency type 1 in the adjacency topology information 1 may indicate a type of a connection between the communication apparatus 1 and another communication apparatus, and the adjacency identifier 1 in the adjacency topology information 1 may indicate the communication apparatus 1 to perform specific tunnel establishment behavior. Therefore, when the adjacency topology information 1 and the adjacency topology information 2 include a same adjacency type and a same adjacency ID, it indicates that the type of the connection between the communication apparatus 1 and the another communication apparatus matches a type of a connection between the communication apparatus 2 and another communication apparatus, and the tunnel establishment behavior performed by the communication apparatus 1 matches that performed by the communication apparatus 2. In this case, it may be determined that the tunnel establishment intentions of the communication apparatus 1 and the communication apparatus 2 match. In another example, when the adjacency type 1 is point-to-point, the adjacency identifier 1 indicates a point-to-point connection between the communication apparatus 1 and another communication apparatus. In this case, when the adjacency topology information 1 and the adjacency topology information 2 include a same adjacency type and a same adjacency ID, it indicates that the adjacency ID 1 indicates a point-to-point connection between the communication apparatus 1 and the communication apparatus 2. In this case, it may be determined that the tunnel establishment intentions of the communication apparatus 1 and the communication apparatus 2 match. In another example, when the adjacency type 1 is full mesh, the adjacency identifier 1 indicates a full-mesh network in which the communication apparatus 1 is located. In this case, when the adjacency topology information 1 and the adjacency topology information 2 include a same adjacency type and a same adjacency ID, it indicates that the communication apparatus 1 and the communication apparatus 2 belong to a same full-mesh network. Therefore, it may be determined that the tunnel establishment intentions of the communication apparatus 1 and the communication apparatus 2 match. In another example, when the adjacency type is point-to-multipoint, the adjacency identifier is used to identify a hub node. In this case, when the adjacency topology information 1 and the adjacency topology information 2 include a same adjacency type and a same adjacency ID, it indicates that the communication apparatus 1 and the communication apparatus 2 are nodes in a same point-to-multipoint network. Therefore, both the communication apparatus 1 and the communication apparatus 2 may establish a tunnel between a spoke node and a hub node. Therefore, in an example, if the adjacency topology information 1 matches the adjacency topology information 2, it may indicate that the adjacency topology information 1 and the adjacency topology information 2 include a same adjacency type and a same adjacency ID.

In an example, similar to the adjacency topology information 1, the adjacency topology information 2 may also include the adjacency type 1 and the adjacency identifier 1. The adjacency type 1 in the adjacency topology information 2 may indicate a type of a connection between the communication apparatus 2 and another communication apparatus, and the adjacency identifier 1 in the adjacency topology information 2 may indicate the communication apparatus 2 to perform specific tunnel establishment behavior.

In an example, when the adjacency type 1 is point-to-point or full mesh, the adjacency identifier 1 in the adjacency topology information 2 indicates the communication apparatus 2 to establish a point-to-point tunnel between the communication apparatus 2 and a communication apparatus whose corresponding adjacency type is the adjacency type 1 and whose corresponding adjacency ID is the adjacency identifier 1. For example, when the adjacency type 1 is point-to-point, the adjacency identifier 1 in the adjacency topology information 2 indicates the communication apparatus 2 to establish a point-to-point tunnel between the communication apparatus 2 and a communication apparatus whose corresponding adjacency type is point-to-point and whose corresponding adjacency ID is the adjacency identifier 1. For another example, when the adjacency type 1 is full mesh, the adjacency identifier 1 in the adjacency topology information 2 indicates the communication apparatus 2 to establish a point-to-point tunnel between the communication apparatus 2 and a communication apparatus whose corresponding adjacency type is full mesh and whose corresponding adjacency ID is the adjacency identifier 1.

In another example, when the adjacency type 1 is point-to-multipoin, the adjacency identifier 1 in the adjacency topology information 2 indicates the communication apparatus 1 to establish a point-to-point tunnel between a spoke node and a hub node. In this case, the communication apparatus 1 may be the hub node or the spoke node. This is not specifically limited in this embodiment of this application. In an example, the communication apparatus 1 is a hub node, and the communication apparatus 2 is a spoke node. In another example, the communication apparatus 1 is a spoke node, and the communication apparatus 2 is a hub node. In an example, when the adjacency type 1 is point-to-multipoint, the adjacency identifier 1 may be used to identify a hub node. In this case, when both the adjacency topology information 1 and the adjacency topology information 2 include the adjacency type 1 and the adjacency identifier 1, there are the following cases.

If the communication apparatus 2 is a hub node, after receiving the adjacency topology information 1 sent by the communication apparatus 1, the communication apparatus 2 determines that the adjacency type 1 is point-to-multipoint, and the adjacency identifier 1 is used to identify the communication apparatus 2. In this case, the communication apparatus 2 may establish the tunnel 1 between a node of the communication apparatus 2 (hub) and a node of the communication apparatus 1 (spoke).

If the communication apparatus 2 is a spoke node, after receiving the adjacency topology information 1 sent by the communication apparatus 1, the communication apparatus 2 determines that the adjacency type 1 is point-to-multipoint, and the adjacency identifier 1 is used to identify the communication apparatus 1. In this case, the communication apparatus 2 may establish the tunnel 1 between a node of the communication apparatus 2 (spoke) and a node of the communication apparatus 1 (hub).

If the communication apparatus 2 is a spoke node, after receiving the adjacency topology information 1 sent by the communication apparatus 1, the communication apparatus 2 determines that the adjacency type 1 is point-to-multipoint, and the adjacency identifier 1 is neither used to identify the communication apparatus 1 nor used to identify the communication apparatus 2. In this case, it indicates that both the communication apparatus 1 and the communication apparatus 2 are spoke nodes, and the communication apparatus 2 does not need to establish a tunnel between the communication apparatus 1 and the communication apparatus 2.

In another example, the adjacency type 1 in the adjacency topology information 2 may indicate a type of a connection between the communication apparatus 2 and another communication apparatus. A meaning of the adjacency identifier 1 in the adjacency topology information 2 is determined based on the connection type indicated by the adjacency type 1 in the adjacency topology information 2. In an example, when the adjacency type 1 in the adjacency topology information 2 is point-to-point, the adjacency identifier 1 in the adjacency topology information 2 indicates a point-to-point connection between the communication apparatus 2 and another communication apparatus. In another example, when the adjacency type 1 in the adjacency topology information 2 is full mesh, the adjacency identifier 1 in the adjacency topology information 2 indicates a full-mesh network in which the communication apparatus 2 is located. In another example, when the adjacency type 1 in the adjacency topology information 2 is point-to-multipoint, the adjacency identifier 1 in the adjacency topology information 2 is used to identify a hub node.

In an example, the communication apparatus 2 may store indication information, and the indication information indicates the communication apparatus 2 to establish the tunnel 1 between the communication apparatus 1 and the communication apparatus 2 when the adjacency topology information 1 matches the adjacency topology information 2 of the communication apparatus 2. The indication information mentioned herein may be preconfigured on the communication apparatus 2, or may be delivered by the controller to the communication apparatus 2. This is not specifically limited in this embodiment of this application.

In another example, if the adjacency identifier 1 in the adjacency topology information 2 can indicate the communication apparatus 2 to perform specific tunnel establishment behavior, the communication apparatus 2 may establish the tunnel 1 between the communication apparatus 1 and the communication apparatus 2 based on the adjacency identifier 1 when the adjacency topology information 1 matches the adjacency topology information 2 of the communication apparatus 2.

In this embodiment of this application, that the communication apparatus 2 establishes the tunnel 1 between the communication apparatus 2 and the communication apparatus 1 may be that, for example, the communication apparatus 2 locally stores related information of the tunnel 1. The related information of the tunnel 1 includes related information of a peer end (that is, the communication apparatus 1) of the tunnel 1 and a status of the tunnel 1, and the related information of the communication apparatus 1 includes but is not limited to an internet protocol (Internet Protocol, IP) of the communication apparatus 1. The status of the tunnel 1 may be, for example, active or inactive. In an example, if the communication apparatus 2 receives a handshake message sent by the communication apparatus 1, the communication apparatus 2 may determine that the status of the tunnel 1 is active. In an example, after determining that the adjacency topology information 1 matches the adjacency topology information 2, the communication apparatus 2 may send a handshake message 1 to the communication apparatus 1. Correspondingly, after receiving the handshake message sent by the communication apparatus 2, the communication apparatus 1 may feed back a handshake message 2 to the communication apparatus 2. After receiving the handshake message 2, the communication apparatus 2 may determine that the status of the tunnel 1 is active. The handshake message mentioned herein may be, for example, a hello packet.

In an example, in addition to receiving the adjacency topology information 1 sent by the communication apparatus 1, the communication apparatus 2 may further receive adjacency topology information sent by another communication apparatus. In an example, the communication apparatus 2 may receive adjacency topology information 3 sent by a communication apparatus 3. An implementation in which the communication apparatus 3 sends the adjacency topology information 3 to the communication apparatus 2 is similar to the implementation in which the communication apparatus 1 sends the adjacency topology information 1 to the communication apparatus 2, and is not repeatedly described herein. After receiving the adjacency topology information 3, the communication apparatus 2 may compare the adjacency topology information 3 with local adjacency topology information. If it is determined that the adjacency topology information 3 matches the local adjacency topology information (for example, the adjacency topology information 2 or other adjacency topology information), the communication apparatus 2 may establish a tunnel 2 between the communication apparatus 2 and the communication apparatus 3.

For specific implementation of establishing the tunnel 2 by the communication apparatus 2, refer to the foregoing specific implementation of establishing the tunnel 1 by the communication apparatus 2, and details are not described herein again.

Further, in addition to receiving the adjacency topology information sent by the another communication apparatus (for example, the communication apparatus 1 and the communication apparatus 3), the communication apparatus 2 may send the adjacency topology information 2 of the communication apparatus 2 to the another communication apparatus. In an example, the communication apparatus 2 may send the adjacency topology information 2 to the communication apparatus 1.

A manner in which the communication apparatus 2 sends the adjacency topology information 2 to the communication apparatus 1 is similar to the manner in which the communication apparatus 1 sends the adjacency topology information 1 to the communication apparatus 2.

In an example, the communication apparatus 2 may send a control packet 2 to the communication apparatus 1, and the control packet 2 carries the adjacency topology information 2. The control packet 2 is not specifically limited in this embodiment of this application. For example, a new control packet may be redefined, and the adjacency topology information 2 is carried in the new control packet and sent to the communication apparatus 1. For another example, an existing control packet may be extended, and a new field may be extended to carry the adjacency topology information 2. For another example, a reserved field or another field that has not been used in an existing control packet may be used to carry the adjacency topology information 2.

In an example, the control packet 2 may be a BOP packet 2. In this case, in an example, the BGP packet may be extended, and a new extended community attribute may be extended to carry the adjacency topology information 2. In this manner, the communication apparatus 2 may send the adjacency topology information 2 to the communication apparatus 1 by using the BGP packet 2.

In an example, the BGP packet 2 may be used to advertise a BOP route 2. In other words, the BGP packet 2 may carry the BGP route. In this case, by sending the BGP packet 2 to the communication apparatus 1, the communication apparatus 2 not only advertises the BGP route to the communication apparatus 1, but also transfers the adjacency topology information to the communication apparatus 1. The BGP route 2 is not specifically limited in this embodiment of this application. In an example, considering that an EVPN service may be configured for both the communication apparatus 1 and the communication apparatus 2, the BOP route 2 may be a BGP EVPN route 2.

Correspondingly, after receiving the adjacency topology information 2, the communication apparatus 1 may match the adjacency topology information 2 with a local adjacency topology. If the communication apparatus 1 determines that the adjacency topology information 2 matches the adjacency topology information 1 of the communication apparatus 1, the communication apparatus 1 may establish the tunnel 1 between the communication apparatus 1 and the communication apparatus 2.

In this embodiment of this application, that the communication apparatus 1 establishes the tunnel 1 between the communication apparatus 2 and the communication apparatus 1 may be that, for example, the communication apparatus 1 locally stores related information of the tunnel 1. The related information of the tunnel 1 includes but is not limited to related information of a peer end (that is, the communication apparatus 2) of the tunnel 1 and a status of the tunnel 1, and the related information of the communication apparatus 2 includes but is not limited to an IP address of the communication apparatus 2. The status of the tunnel 1 may be, for example, active or inactive. In an example, if the communication apparatus 1 receives a handshake message sent by the communication apparatus 2, the communication apparatus 1 may determine that the status of the tunnel 1 is active.

It can be learned that, in this solution, the communication apparatus 2 may determine, based on the tunnel establishment intention of the communication apparatus 2 and the tunnel establishment intention of the communication apparatus 1, that a tunnel between the communication apparatus 1 and the communication apparatus 2 needs to be established, and further establish the tunnel 1 between the communication apparatus 1 and the communication apparatus 2. The communication apparatus 2 may locally store only the adjacency topology information 2 of the communication apparatus 2. Compared with that in the conventional technology in which information about two endpoints of a tunnel needs to be configured on the communication apparatus 2, configuration for the communication apparatus 2 is simpler. When there are a relatively large quantity of sites that need to be interconnected, compared with the conventional technology, this solution can greatly reduce workload of configuring a tunnel endpoint, so that efficiency of establishing a tunnel between sites is improved. In addition, for a plurality of communication apparatuses that have an interconnection requirement, the communication apparatuses may establish tunnels by using the solution provided in this embodiment of this application. After all the foregoing communication apparatuses that have the interconnection requirement establish tunnels by using this solution, these tunnels may form a large interconnection network. The interconnection network can support various network topologies. In the conventional technology, a controller is used for network orchestration, and only a network with a specific topology structure can be orchestrated. This solution can implement flexible networking.

The following describes a technical solution according to embodiments of this application by using examples with reference to the scenarios shown in FIG. 1a and FIG. 1b.

In the scenario shown in FIG. 1a, details are as follows.

Figure 3A:
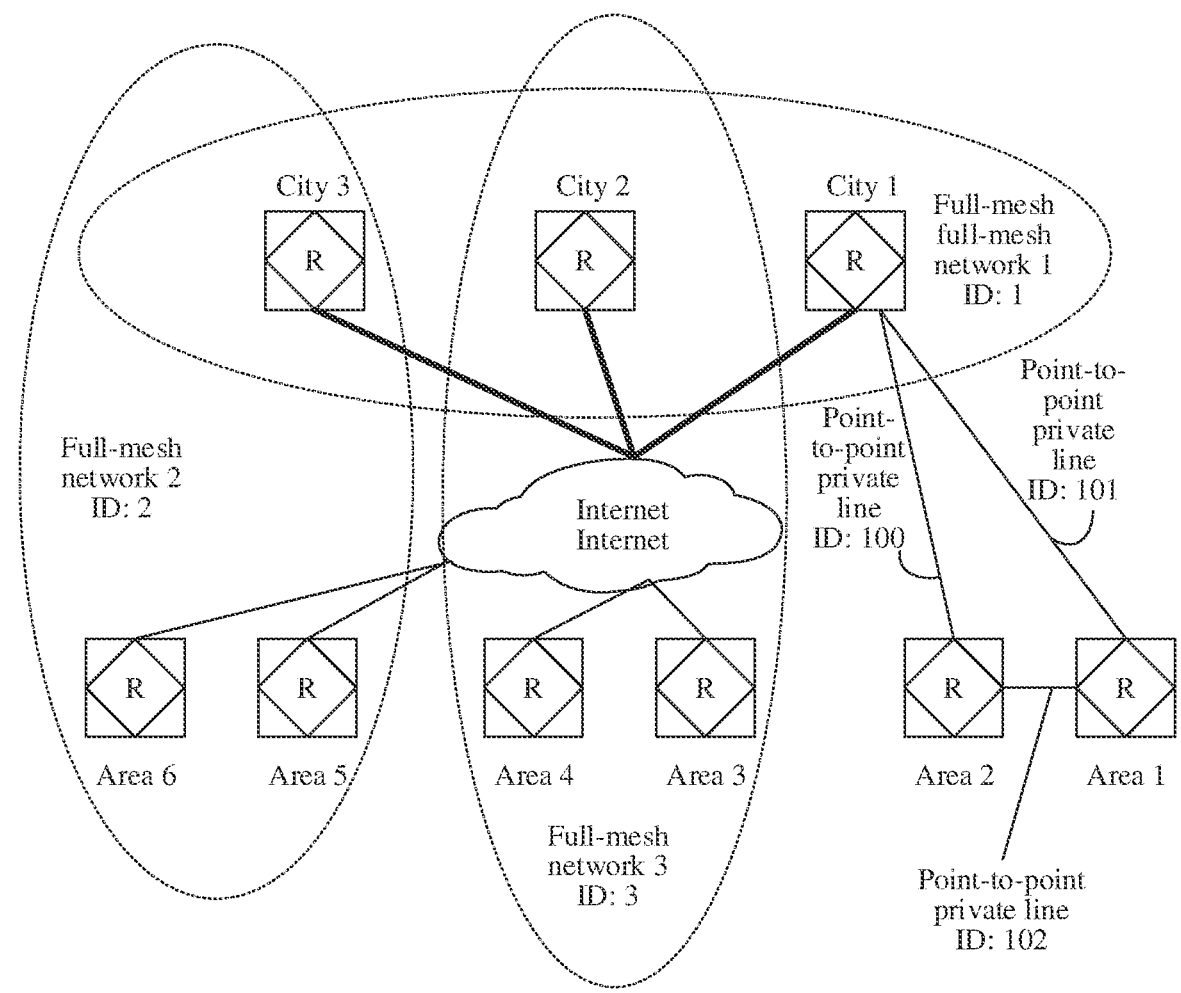
FIG. 3a is a schematic diagram of a networking intention according to an embodiment of this application.

A networking intention may be shown in FIG. 3a. FIG. 3a is a schematic diagram of a networking intention according to an embodiment of this application.

(1) A city 1, a city 2, and a city 3 form a full-mesh network 1.

(2) A point-to-point private line is established between every two of a city 2 city 1 area 1, an area 2, and the city 1.

(3) An area 3, an area 4, and the city 2 form a full-mesh network 2.

(4) An area 5, an area 6, and the city 3 form a full-mesh network 3.

In this embodiment of this application, a value of an adjacency type "point-to-point" is 1, and a value of an adjacency type "full mesh" is 3. Based on the foregoing networking intention:

an adjacency identifier 1 is used to identify the full-mesh network 1;

an adjacency identifier 2 is used to identify the full-mesh network 2;

an adjacency identifier 3 is used to identify the full-mesh network 3;

an adjacency identifier 100 is used to identify a point-to-point connection between the city 1 and the area 2;

an adjacency identifier 101 is used to identify a point-to-point connection between the city 1 and the area 1; and an adjacency identifier 102 is used to identify a point-to-point connection between the area 1 and the area 2.

Therefore, the city 3 and the city 1 may determine that an adjacent topology intention of each site is shown in Table 1.

TABLE 1

| Site | Adjacency type | Adjacency identifier |
|---|---|---|
| City 1 | 3 | 1 |
| City 1 | 1 | 100 |
| City 1 | 1 | 101 |
| Area 2 | 1 | 100 |
| Area 2 | 1 | 102 |
| Area 1 | 1 | 101 |
| Area 1 | 1 | 102 |
| City 2 | 3 | 1 |
| City 2 | 3 | 2 |
| Area 4 | 3 | 2 |
| Area 3 | 3 | 2 |
| City 3 | 3 | 1 |
| City 3 | 3 | 3 |
| Area 6 | 3 | 3 |
| Area 5 | 3 | 3 |

One row in the foregoing table indicates one piece of adjacency topology information. For example, the first row indicates one piece of adjacency topology information corresponding to a site corresponding to the City 1, the second row indicates another piece of adjacency topology information corresponding to the site corresponding to the city 1, and the third, row indicates still another piece of adjacency topology information corresponding to the site corresponding to the city 1.

Each site may send adjacency topology information of the site to another site by using a control packet. Therefore, each site may obtain adjacency topology information of another site and adjacency topology information of the site.

A site corresponding to the site city 1 is used as an example. The site corresponding to the city 1 compares adjacency topology information of the site with adjacency topology information of another site.

Because the adjacency topology information in the first row matches the adjacency topology information in the eighth row, the site corresponding to the city 1 may determine to establish a tunnel between the site corresponding to the city 1 and a site corresponding to the city 2.

Because the adjacency topology information in the first row matches the adjacency topology information in the twelfth row, the site corresponding to the city 1 may establish a tunnel between the site corresponding to the city 1 and a site corresponding to the city 3.

Because the adjacency topology information in the second row matches the adjacency topology information in the fourth row, the site corresponding to the city 1 may establish a tunnel between the site corresponding to the city 1 and a site corresponding to the area 2.

Because the adjacency topology information in the third row matches the adjacency topology information in the sixth row, the site corresponding to the city 1 may establish a tunnel between the site corresponding to the city 1 and a site corresponding to the area 1.

Figure 3B:
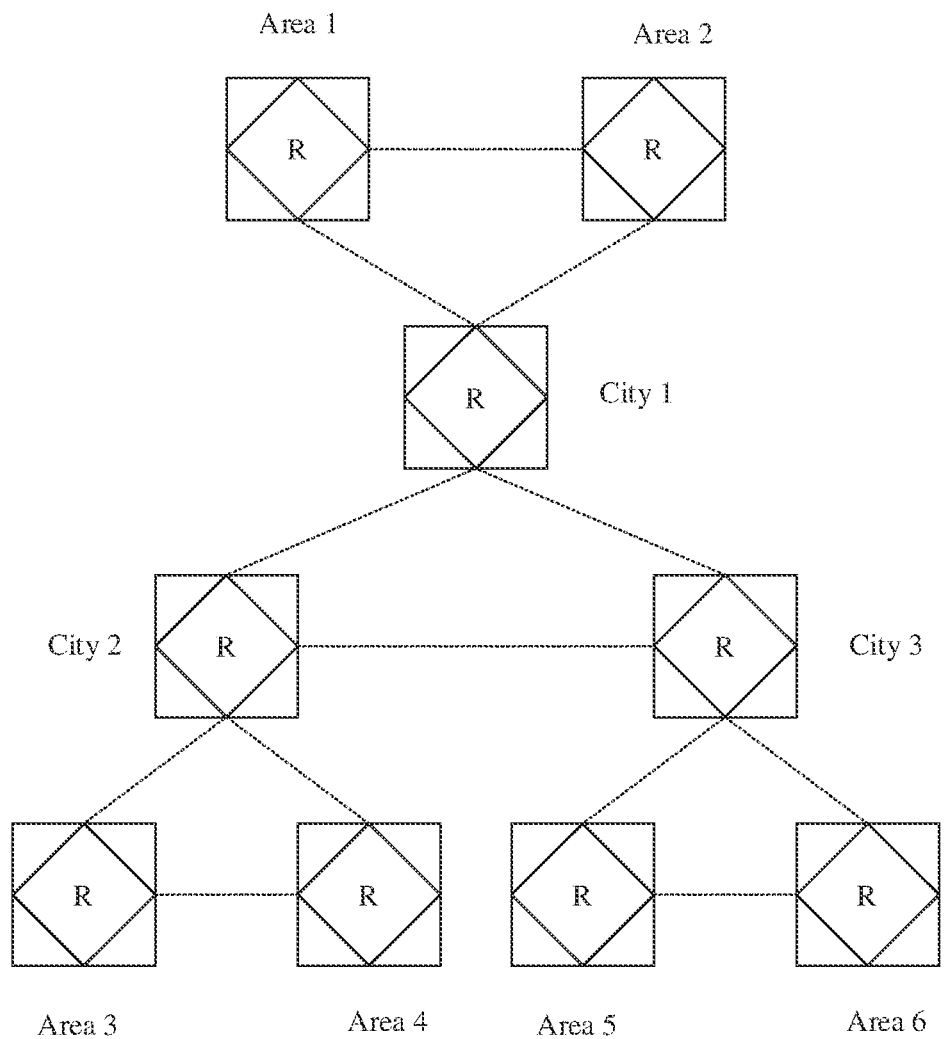
FIG. 3b is a schematic diagram of a network structure according to an embodiment of this application.

By analogy, an interconnection network shown in FIG. 3b may be obtained after tunnels between all sites are established. FIG. 3b is a schematic diagram of a network structure according to an embodiment of this application. In FIG. 3b, one dotted line represents one tunnel.

In an example, the communication apparatus 1 and the communication apparatus 2 in the foregoing method embodiment may correspond to any two different sites shown in FIG. 1a. For example, the communication apparatus 1 corresponds to the site corresponding to the city 1, and the communication apparatus 2 corresponds to the site corresponding to the area 1. For another example, the communication apparatus 1 corresponds to the site corresponding to the city 1, and the communication apparatus 2 corresponds to the site corresponding to the city 2, and so on. Details are not listed one by one herein.

In the scenario shown in FIG. 1b, details are as follows.

Figure 3C:
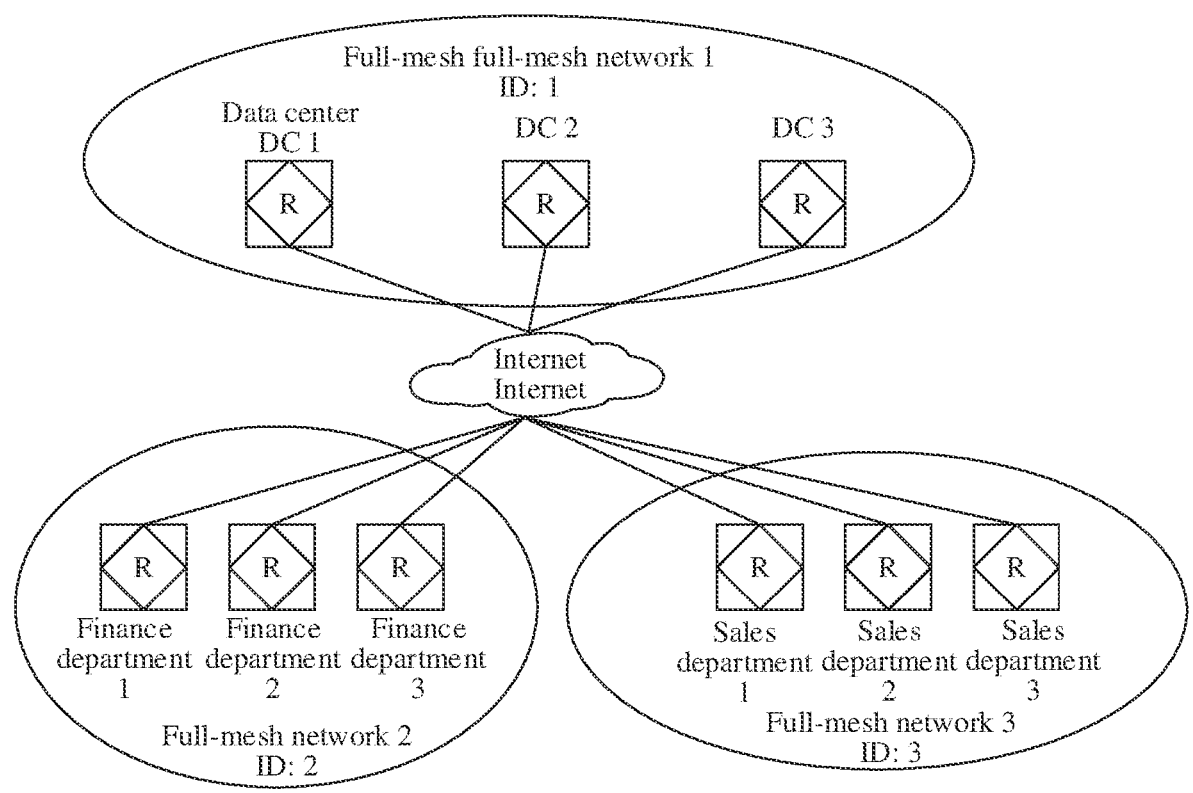
FIG. 3c is a schematic diagram of another networking intention according to an embodiment of this application.

A networking intention may be shown in FIG. 3c. FIG. 3c is a schematic diagram of another networking intention according to an embodiment of this application. As shown in FIG. 3c:

(1) three DCs form a full-mesh network 1;
(2) three finance departments form a full-mesh network 2; and
(3) three sales departments form a full-mesh network 3.

In addition, the scenario shown in FIG. 1b further includes the following networking intention that is not shown in FIG. 3c:

(4) a DC 1, the three finance departments, and the three sales departments form a point-to-multipoint network 1, where the DC 1 is a hub node, and the three finance departments and the three sales departments are six spoke nodes;
(5) a DC 2, the three finance departments, and the three sales departments form a point-to-multipoint network 2, where the DC 2 is a hub node, and the three finance departments and the three sales departments are six spoke nodes; and
(6) a DC 3, the three finance departments, and the three sales departments form a point-to-multipoint network 3, where the DC 3 is a hub node, and the three finance departments and the three sales departments are six spoke nodes.

In this embodiment of this application, a value of an adjacency type "point-to-multipoint" is 2, and a value of an adjacency type "full mesh" is 3. Based on the foregoing networking intention:

an adjacency identifier 1 is used to identify the full-mesh network 1;
an adjacency identifier 2 is used to identify the full-mesh network 2; and
an adjacency identifier 3 is used to identify the full-mesh network 3.

For a node in a point-to-multipoint network, an adjacency identifier of the node is an identifier of a corresponding hub node. For example, for a node in the point-to-multipoint network 1, an adjacency identifier of the node is a DC 1 ID; for a node in the point-to-multipoint network 2, an adjacency identifier of the node is a DC 2 ID; and for a node in the point-to-multipoint network 3, an adjacency identifier of the node is a DC 3 ID. The DC 1 ID is used to identify the DC 1, and the DC 1 ID is not specifically limited in this embodiment of this application.

Based on this, it may be determined that an adjacent topology intention of each site is shown in Table 2.

TABLE 2

| Site | Adjacency type | Adjacency identifier |
|---|---|---|
| DC 1 | 2 | DC1 ID |
| DC 1 | 3 | 1 |
| DC 2 | 2 | DC2 ID |
| DC 2 | 3 | 1 |
| DC 3 | 2 | DC3 ID |
| DC 3 | 3 | 1 |
| Finance department 1 | 2 | DC1 ID |
| Finance department 1 | 2 | DC2 ID |

TABLE 2-continued

| Site | Adjacency type | Adjacency identifier |
|---|---|---|
| Finance department 1 | 2 | DC3 ID |
| Finance department 1 | 3 | 2 |
| Finance department 2 | 2 | DC1 ID |
| Finance department 2 | 2 | DC2 ID |
| Finance department 2 | 2 | DC3 ID |
| Finance department 2 | 3 | 2 |
| Finance department 3 | 2 | DC1 ID |
| Finance department 3 | 2 | DC2 ID |
| Finance department 3 | 2 | DC3 ID |
| Finance department 3 | 3 | 2 |
| Sales department 1 | 2 | DC1 ID |
| Sales department 1 | 2 | DC2 ID |
| Sales department 1 | 2 | DC3 ID |
| Sales department 1 | 3 | 3 |
| Sales department 2 | 2 | DC1 ID |
| Sales department 2 | 2 | DC2 ID |
| Sales department 2 | 2 | DC3 ID |
| Sales department 2 | 3 | 3 |
| Sales department 3 | 2 | DC1 ID |
| Sales department 3 | 2 | DC2 ID |
| Sales department 3 | 2 | DC3 ID |
| Sales department 3 | 3 | 3 |

One row in Table 2 indicates one piece of adjacency topology information. For example, the first row indicates one piece of adjacency topology information corresponding to the DC 1, and the second row indicates another piece of adjacency topology information corresponding to the DC 1.

Each site may send adjacency topology information of the site to another site by using a control packet. Therefore, each site may obtain adjacency topology information of another site and adjacency topology information of the site.

The site DC 1 is used as an example. The site DC 1 compares adjacency topology information of the DC 1 with adjacency topology information of another site.

Because the adjacency topology information in the first row matches all of the adjacency topology information in the seventh row, the adjacency topology information in the eleventh row, the adjacency topology information in the fifteenth row, the adjacency topology information in the nineteenth row, the adjacency topology information in the twenty-third row, and the adjacency topology information in the twenty-seventh row, the site DC 1 serving as a hub site may establish a tunnel between the site DC 1 and the finance department 1, a tunnel between the site DC 1 and the finance department 2, a tunnel between the site DC 1 and the finance department 2, a tunnel between the site DC 1 and the sales department 1, a tunnel between the site DC 1 and the sales department 2, and a tunnel between the site DC 1 and the sales department 3.

Because the adjacency topology information in the second row matches both the adjacency topology information in the fourth row and the adjacency topology information in the sixth row, the site DC 1 may establish a tunnel between the sites DC 1 and DC 2 and a tunnel between the sites DC 1 and DC 3.

Figure 3D:
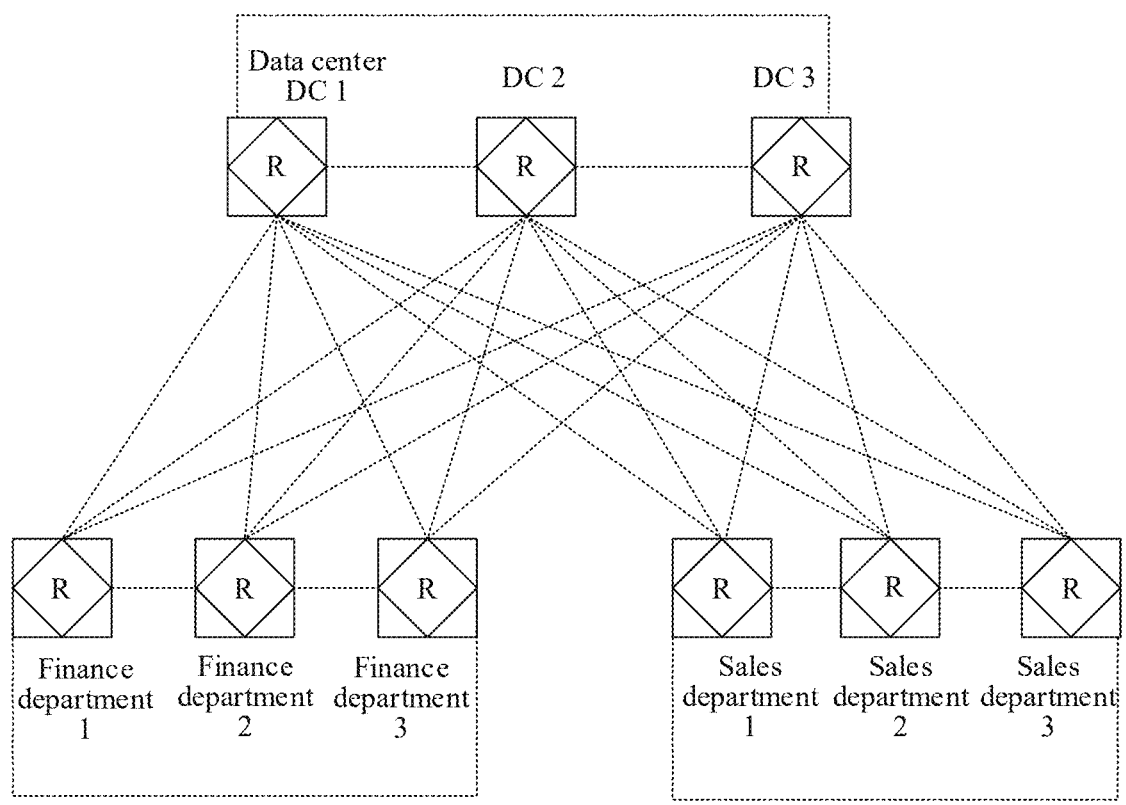
FIG. 3d is a schematic diagram of another network structure according to an embodiment of this application.

By analogy, an interconnection network shown in FIG. 3d may be obtained after tunnels between all sites are established. FIG. 3d is a schematic diagram of another network structure according to an embodiment of this application. In FIG. 3d, one dotted line represents one tunnel.

In an example, the communication apparatus 1 and the communication apparatus 2 in the foregoing method embodiment may correspond to any two different sites shown in FIG. 1b. For example, the communication apparatus 1 corresponds to the site corresponding to the DC 1, and the communication apparatus 2 corresponds to the site corresponding to the DC 2. For another example, the communication apparatus 1 corresponds to the site corresponding to the DC 1, and the communication apparatus 2 corresponds to the site corresponding to the finance department 1, and so on. Details are not listed one by one herein.

It should be noted that, Table 1 and Table 2 are used to schematically describe an adjacency type and an adjacency identifier of each site, and form no limitation on this embodiment of this application.

Figure 4:
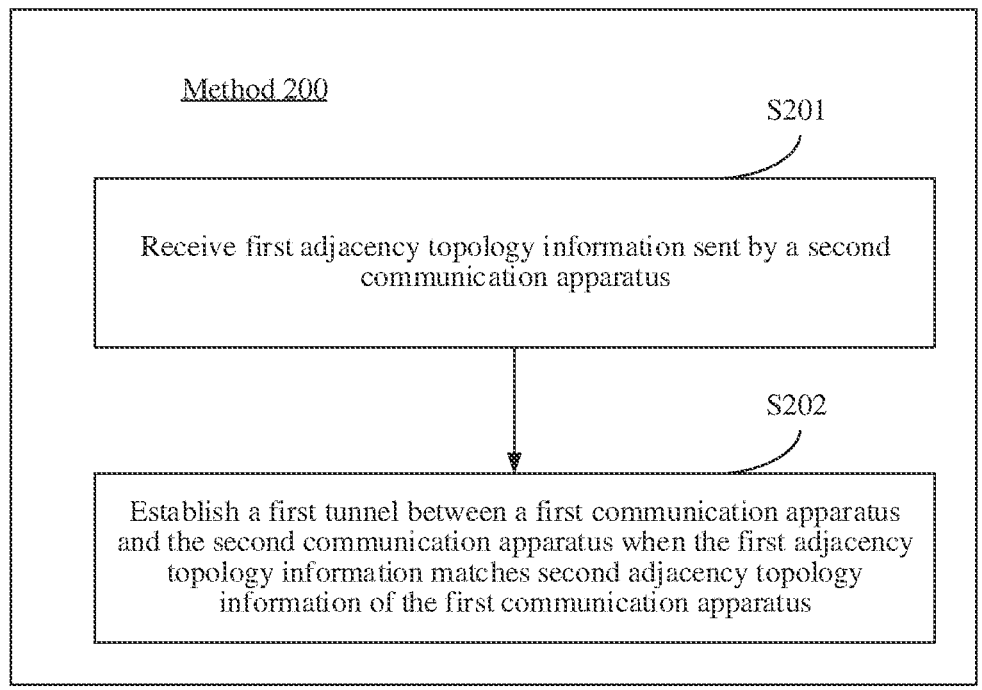
FIG. 4 is a schematic flowchart of a tunnel establishment method according to an embodiment of this application.

An embodiment of this application further provides a tunnel establishment method. FIG. 4 is a schematic flowchart of a tunnel establishment method according to an embodiment of this application. The tunnel establishment method 200 shown in FIG. 4 may be performed by a first communication apparatus.

The tunnel establishment method 200 may be applied to the method 100 mentioned in the foregoing embodiment. Correspondingly, the first communication apparatus may correspond to the communication apparatus 2 in the method 100.

For example, the method 200 may include the following S201 and S202.

S201: Receive first adjacency topology information sent by a second communication apparatus.

S202: Establish a first tunnel between the first communication apparatus and the second communication apparatus when the first adjacency topology information matches second adjacency topology information of the first communication apparatus.

The second communication apparatus in the method 200 may correspond to the communication apparatus 1 in the method 100. The first adjacency topology information in the method 200 may correspond to the adjacency topology information 1 in the method 100. The second adjacency topology information in the method 200 may correspond to the adjacency topology information 2 in the method 100. The first tunnel in the method 200 may correspond to the tunnel 1 in the method 100.

In a possible implementation, the receiving first adjacency topology information sent by a second communication apparatus includes: receive a first control packet sent by the second communication apparatus, where the first control packet includes the first adjacency topology information.

The first control packet in the method 200 may correspond to the control packet 1 in the method 100.

In a possible implementation, the first control packet is a first border gateway protocol BGP packet.

The first BOP packet in the method 200 may correspond to the BGP packet 1 in the method 100.

In a possible implementation, the first BGP packet is used to advertise a first border gateway protocol BGP route.

The first BGP route in the method 200 may correspond to the BGP route 1 in the method 100.

In a possible implementation, the first BGP route is a first BGP Ethernet virtual private network EVPN route.

The first BGP EVPN route in the method 200 may correspond to the BGP EVPN route 1 in the method 100.

In a possible implementation, the first adjacency topology information includes: a first adjacency type and a first adjacency identifier ID.

In a possible implementation, the second adjacency topology information includes: the first adjacency type and the first adjacency ID.

The first adjacency type in the method 200 may correspond to the adjacency type 1 in the method 100, and the first adjacency identifier in the method 200 may correspond to the adjacency identifier 1 in the method 100.

In a possible implementation, that the first adjacency topology information matches the second adjacency topology information of the first communication apparatus includes:
the first adjacency topology information and the second adjacency topology information include a same adjacency type and a same adjacency ID.

In a possible implementation, the first adjacency type includes any one of the following:
point-to-point, point-to-multipoint, or full mesh.

In a possible implementation,
the first adjacency type is point-to-point or full mesh, and the first adjacency ID indicates the first communication apparatus to establish a point-to-point tunnel between the first communication apparatus and a communication apparatus whose corresponding adjacency type is the first adjacency type and whose corresponding adjacency ID is the first adjacency ID; or
when the first adjacency type is point-to-point, the first adjacency ID indicates a point-to-point connection between the first communication apparatus and another communication apparatus; or when the first adjacency type is full mesh, the first adjacency ID indicates a full mesh network in which the first communication apparatus is located.

In a possible implementation, the first adjacency type is point-to-multipoint, and the first adjacency ID indicates the first communication apparatus to establish a point-to-point tunnel between a spoke spoke node and a hub hub node.

In a possible implementation, the first communication apparatus is the hub node, and the second communication apparatus is the spoke node, or the first communication apparatus is the spoke node, and the second communication apparatus is the hub node.

In a possible implementation, the first adjacency ID identifies the hub node.

In a possible implementation, the method further includes: receiving third adjacency topology information sent by a third communication apparatus; and establishing a second tunnel between the first communication apparatus and the third communication apparatus when the third adjacency topology information matches the second adjacency topology information.

The third communication apparatus in the method 200 may correspond to the communication apparatus 3 in the method 100. The third adjacency topology information in the method 200 may correspond to the adjacency topology information 3 in the method 100. The second tunnel in the method 200 may correspond to the tunnel 2 in the method 100.

In a possible implementation, the method further includes: sending the second adjacency topology information to the second communication apparatus.

In a possible implementation, the sending the second adjacency topology information to the second communication apparatus includes: sending a second control packet to the second communication apparatus, where the second control packet includes the second adjacency topology information.

The second control packet in the method 200 may correspond to the control packet 2 in the method 100.

In a possible implementation, the second control packet is a second BGP packet.

The second BOP packet in the method 200 may correspond to the BGP packet 2 in the method 100.

In a possible implementation, the second BOP packet route is used to advertise a second BOP route.

The second BGP route in the method 200 may correspond to the BGP route 2 in the method 100.

In a possible implementation, the second BOP route is a second BGP EVPN route.

The second BGP EVPN route in the method 200 may correspond to the BGP EVPN route 2 in the method 100.

In a possible implementation, the method further includes: locally preconfiguring the second adjacency topology information.

In a possible implementation, the method further includes: receiving the second adjacency topology information sent by a controller.

For specific implementation of the method 200, refer to the related description of the method 100, and details are not described herein again.

Figure 5:
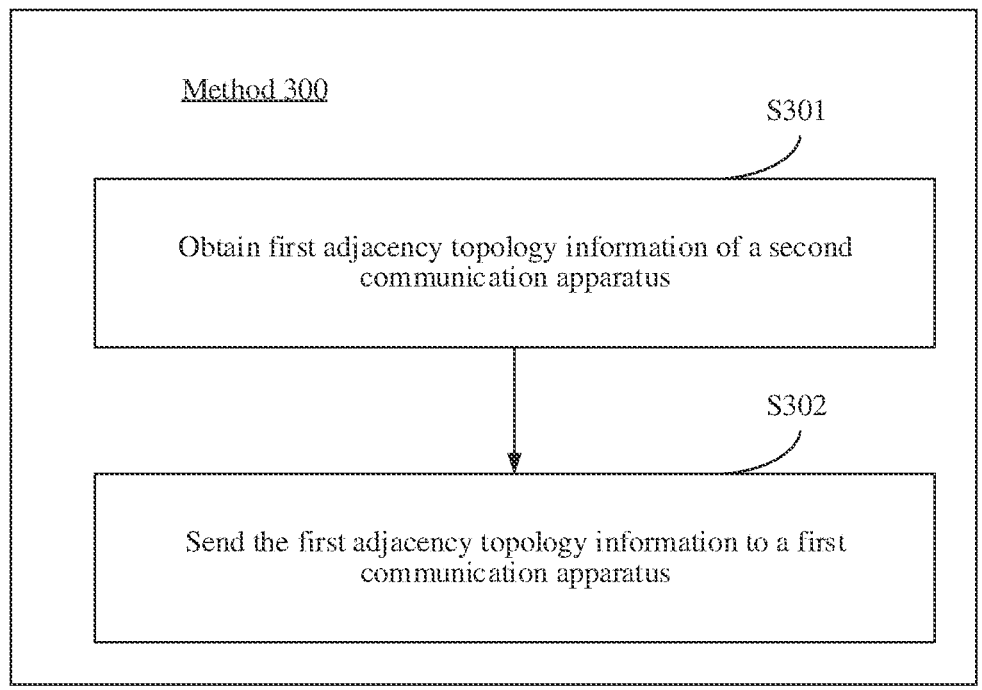
FIG. 5 is a schematic flowchart of an information release method according to an embodiment of this application.

An embodiment of this application further provides an information release method. FIG. 5 is a schematic flowchart of an information release method according to an embodiment of this application. The information release method 300 shown in FIG. 5 may be performed by a second communication apparatus.

The information release method 300 may be applied to the method 100 mentioned in the foregoing embodiment. Correspondingly, the second communication apparatus may correspond to the communication apparatus 1 in the method 100.

For example, the method 300 may include the following S301 and S302.

S301: Obtain first adjacency topology information of the second communication apparatus.

S302: Send the first adjacency topology information to a first communication apparatus.

The first communication apparatus in the method 300 may correspond to the communication apparatus 2 in the method 100. The first adjacency topology information in the method 300 may correspond to the adjacency topology information 1 in the method 100.

In a possible implementation, the obtaining first adjacency topology information of the second communication apparatus includes: obtaining the first adjacency topology information preconfigured on the second communication apparatus locally.

In a possible implementation, the obtaining first adjacency topology information of the second communication apparatus includes: receiving the first adjacency topology information sent by a controller.

In a possible implementation, the sending the first adjacency topology information to a first communication apparatus includes: sending a first control packet to the first communication apparatus, where the first control packet includes the first adjacency topology information.

The first control packet in the method 300 may correspond to the control packet 1 in the method 100.

In a possible implementation, the first control packet is a first border gateway protocol BGP packet.

The first BGP packet in the method 300 may correspond to the BGP packet 1 in the method 100.

In a possible implementation, the first BGP packet is used to advertise a first border gateway protocol BGP route.

The first BGP route in the method 300 may correspond to the BOP route 1 in the method 100.

In a possible implementation, the first BGP route is a first BGP Ethernet virtual private network EVPN route.

The first BGP EVPN route in the method 300 may correspond to the BGP EVPN route 1 in the method 100.

In a possible implementation, the method further includes: receiving second adjacency topology information sent by the first communication apparatus.

The second adjacency topology information in the method 300 may correspond to the adjacency topology information 2 in the method 100.

In a possible implementation, the receiving second adjacency topology information sent by the first communication apparatus includes: receiving a second control packet sent by the first communication apparatus, where the second control packet includes the second adjacency topology information.

The second control packet in the method 300 may correspond to the control packet 2 in the method 100.

In a possible implementation, the second control packet is a second BGP packet.

The second BGP packet in the method 300 may correspond to the BGP packet 2 in the method 100.

In a possible implementation, the second BGP packet route is used to advertise a second BGP route.

The second BGP route in the method 300 may correspond to the BGP route 2 in the method 100.

In a possible implementation, the second BGP route is a second BGP EVPN route.

The second BGP EVPN route in the method 300 may correspond to the BGP EVPN route 2 in the method 100.

In a possible implementation, the method further includes: establishing a tunnel between the first communication apparatus and the second communication apparatus when the first adjacency topology information matches the second adjacency topology information.

In a possible implementation, the first adjacency topology information includes: a first adjacency type and a first adjacency identifier ID.

In a possible implementation, the second adjacency topology information includes: the first adjacency type and the first adjacency ID.

The first adjacency type in the method 300 may correspond to the adjacency type 1 in the method 100. The first adjacency ID in the method 300 may correspond to the adjacency identifier 1 in the method 100.

In a possible implementation, that the first adjacency topology information matches the second adjacency topology information of the first communication apparatus includes: the first adjacency topology information and the second adjacency topology information include a same adjacency type and a same adjacency ID.

In a possible implementation, the first adjacency type includes any one of the following: point-to-point, point-to-multipoint, or full mesh.

In a possible implementation,
the first adjacency type is point-to-point or full mesh, and the first adjacency ID indicates the second communication apparatus to establish a point-to-point tunnel between the second communication apparatus and a communication apparatus whose corresponding adjacency relationship type is the first adjacency type and whose corresponding adjacency ID is the first adjacency ID; or
when the first adjacency type is point-to-point, the first adjacency ID indicates a point-to-point connection between the second communication apparatus and another communication apparatus; or when the first adjacency type is full mesh, the first adjacency ID indicates a full mesh network in which the second communication apparatus is located.

In a possible implementation, the first adjacency type is point-to-multipoint, and the first adjacency ID indicates the second communication apparatus to establish a point-to-point tunnel between a spoke spoke node and a hub hub node.

In a possible implementation, the first communication apparatus is the hub node, and the second communication apparatus is the spoke node, or the first communication apparatus is the spoke node, and the second communication apparatus is the hub node.

In a possible implementation, the first adjacency ID identifies the hub node.

For specific implementation of the method 300, refer to the related description of the method 100, and details are not described herein again.

Figure 6:
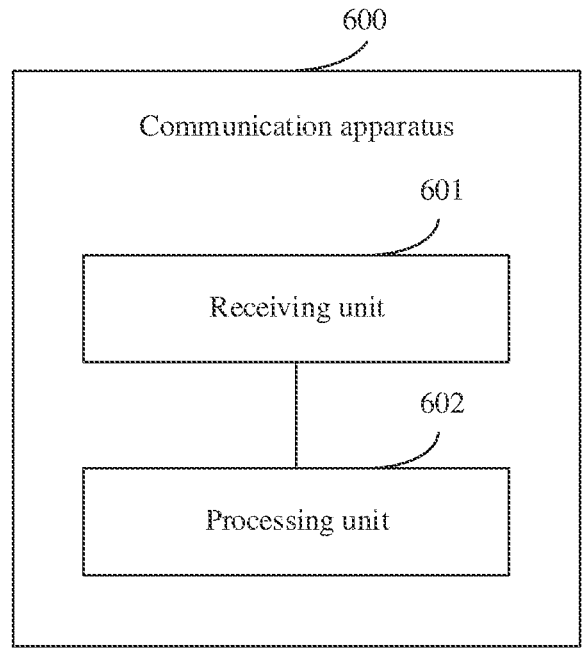
FIG. 6 is a schematic diagram of a structure of a communication apparatus according to an embodiment of this application.

An embodiment of this application further provides a first communication apparatus. FIG. 6 is a schematic diagram of a structure of a communication apparatus according to an embodiment of this application. The first communication apparatus 600 shown in FIG. 6 may include a receiving unit 601 and a processing unit 602.

In an example, the first communication apparatus may be configured to perform the steps performed by the communication apparatus 2 in the foregoing method 100, or perform the steps performed by the first communication apparatus in the foregoing method 200. In this case:

the receiving unit 601 is configured to receive first adjacency topology information sent by a second communication apparatus; and the processing unit 602 is configured to establish a first tunnel between the first communication apparatus and the second communication apparatus when the first adjacency topology information matches second adjacency topology information of the first communication apparatus.

In a possible implementation, the receiving unit 601 is configured to receive a first control packet sent by the second communication apparatus, where the first control packet includes the first adjacency topology information.

In a possible implementation, the first control packet is a first border gateway protocol BGP packet.

In a possible implementation, the first BGP packet is used to advertise a first border gateway protocol BGP route.

In a possible implementation, the first BOP route is a first BOP Ethernet virtual private network EVPN route.

In a possible implementation, the first adjacency topology information includes: a first adjacency type and a first adjacency identifier ID.

In a possible implementation, the second adjacency topology information includes: the first adjacency type and the first adjacency ID.

In a possible implementation, that the first adjacency topology information matches the second adjacency topology information of the first communication apparatus includes: the first adjacency topology information and the second adjacency topology information include a same adjacency type and a same adjacency ID.

In a possible implementation, the first adjacency type includes any one of the following: point-to-point, point-to-multipoint, or full mesh.

In a possible implementation, the first adjacency type is point-to-point or full mesh, and the first adjacency ID indicates the first communication apparatus to establish a point-to-point tunnel between the first communication apparatus and a communication apparatus whose corresponding adjacency type is the first adjacency type and whose corresponding adjacency ID is the first adjacency ID. Alternatively, when the first adjacency type is point-to-point, the first adjacency ID indicates a point-to-point connection between the first communication apparatus and another communication apparatus; or when the first adjacency type is full mesh, the first adjacency ID indicates a full mesh network in which the first communication apparatus is located.

In a possible implementation, the first adjacency type is point-to-multipoint, and the first adjacency ID indicates the first communication apparatus to establish a point-to-point tunnel between a spoke spoke node and a hub hub node.

In a possible implementation, the first communication apparatus is the hub node, and the second communication apparatus is the spoke node, or the first communication apparatus is the spoke node, and the second communication apparatus is the hub node.

In a possible implementation, the first adjacency ID identifies the hub node.

In a possible implementation, the receiving unit 601 is further configured to receive third adjacency topology information sent by a third communication apparatus. The processing unit 602 is further configured to establish a second tunnel between the first communication apparatus and the third communication apparatus when the third adjacency topology information matches the second adjacency topology information.

In a possible implementation, the apparatus further includes: a sending unit, configured to send the second adjacency topology information to the second communication apparatus.

In a possible implementation, the sending unit is configured to send a second control packet to the second communication apparatus, where the second control packet includes the second adjacency topology information.

In a possible implementation, the second control packet is a second BGP packet.

In a possible implementation, the second BGP packet route is used to advertise a second BGP route.

In a possible implementation, the second BGP route is a second BGP EVPN route.

In a possible implementation, the processing unit 602 is further configured to locally preconfigure the second adjacency topology information.

In a possible implementation, the receiving unit 601 is further configured to receive the second adjacency topology information sent by a controller.

Figure 7:
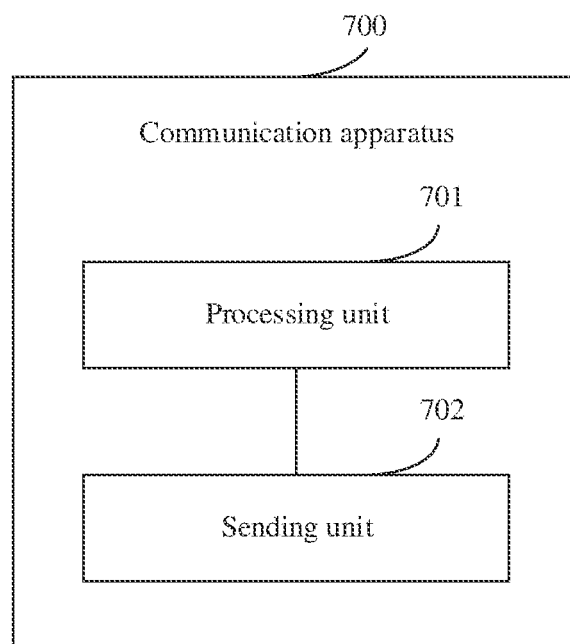
FIG. 7 is a schematic diagram of a structure of a communication apparatus according to an embodiment of this application.

An embodiment of this application further provides a second communication apparatus. FIG. 7 is a schematic diagram of a structure of a communication apparatus according to an embodiment of this application. The second communication apparatus 700 shown in FIG. 7 may include a processing unit 701 and a sending unit 702.

In an example, the second communication apparatus may be configured to perform the steps performed by the communication apparatus 1 in the foregoing method 100, or perform the steps performed by the second communication apparatus in the foregoing method 300. In this case:

the processing unit 701 is configured to obtain first adjacency topology information of the second communication apparatus; and the sending unit 702 is configured to send the first adjacency topology information to a first communication apparatus.

In a possible implementation, the processing unit 701 is configured to obtain the first adjacency topology information preconfigured on the second communication apparatus locally.

In a possible implementation, the processing unit 701 is configured to receive the first adjacency topology information sent by a controller.

In a possible implementation, the sending unit 702 is configured to send a first control packet to the first communication apparatus, where the first control packet includes the first adjacency topology information.

In a possible implementation, the first control packet is a first border gateway protocol BGP packet.

In a possible implementation, the first BGP packet is used to advertise a first border gateway protocol BGP route.

In a possible implementation, the first BGP route is a first BGP Ethernet virtual private network EVPN mute.

In a possible implementation, the apparatus further includes: a receiving unit, configured to receive second adjacency topology information sent by the first communication apparatus.

In a possible implementation, the receiving unit is configured to receive a second control packet sent by the first communication apparatus, where the second control packet includes the second adjacency topology information.

In a possible implementation, the second control packet is a second BGP packet.

In a possible implementation, the second BGP packet route is used to advertise a second BGP route.

In a possible implementation, the second BGP route is a second BGP EVPN route.

In a possible implementation, the processing unit 701 is further configured to establish a tunnel between the first communication apparatus and the second communication apparatus when the first adjacency topology information matches the second adjacency topology information.

In a possible implementation, the first adjacency topology information includes: a first adjacency type and a first adjacency identifier ID.

In a possible implementation, the second adjacency topology information includes: the first adjacency type and the first adjacency ID.

In a possible implementation, that the first adjacency topology information matches the second adjacency topology information of the first communication apparatus includes: the first adjacency topology information and the second adjacency topology information include a same adjacency type and a same adjacency ID.

In a possible implementation, the first adjacency type includes any one of the following: point-to-point, point-to-multipoint, or full mesh.

In a possible implementation, the first adjacency type is point-to-point or full mesh, and the first adjacency ID indicates the second communication apparatus to establish a point-to-point tunnel between the second communication apparatus and a communication apparatus whose corresponding adjacency relationship type is the first adjacency type and whose corresponding adjacency ID is the first adjacency ID. Alternatively, when the first adjacency type is point-to-point, the first adjacency ID indicates a point-to-point connection between the second communication apparatus and another communication apparatus; or when the first adjacency type is full mesh, the first adjacency ID indicates a full mesh network in which the second communication apparatus is located.

In a possible implementation, the first adjacency type is point-to-multipoint, and the first adjacency ID indicates the second communication apparatus to establish a point-to-point tunnel between a spoke spoke node and a hub hub node.

In a possible implementation, the first communication apparatus is the hub node, and the second communication apparatus is the spoke node, or the first communication apparatus is the spoke node, and the second communication apparatus is the hub node.

In a possible implementation, the first adjacency ID identifies the hub node.

Figure 8:
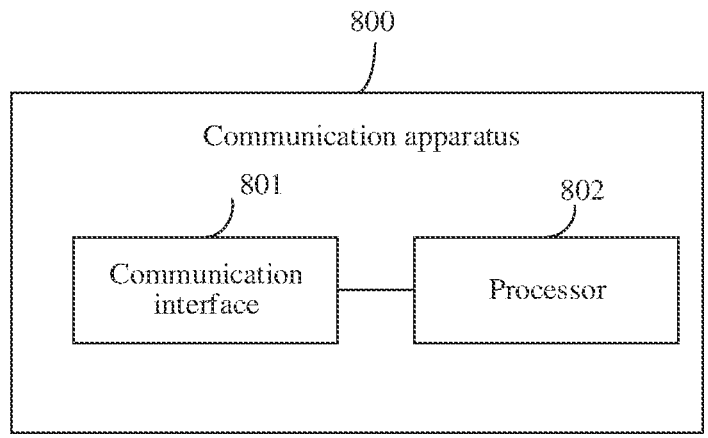
FIG. 8 is a schematic diagram of a structure of a communication apparatus according to an embodiment of this application.

In addition, an embodiment of this application further provides a communication apparatus 800. FIG. 8 is a schematic diagram of a structure of a communication apparatus according to an embodiment of this application. The communication apparatus 800 includes a communication interface 801 and a processor 802 connected to the communication interface 801. The communication apparatus 800 may be configured to perform the method 100, the method 200, or the method 300 in the foregoing embodiment.

In an example, the communication apparatus 800 may perform the method 100 in the foregoing embodiment. When the communication apparatus 800 is configured to perform the method 100 in the foregoing embodiment, the communication apparatus 800 is equivalent to the communication apparatus 1 in the method 100. The communication interface 801 is configured to perform a receiving/sending operation performed by the communication apparatus 1 in the method 100. The processor 802 is configured to perform an operation other than the receiving/sending operation performed by the communication apparatus 1 in the method 100. For example, the processor 802 is configured to obtain adjacency topology information 1 of the communication apparatus 1; and the communication interface 801 is configured to send the adjacency topology information 1 to a communication apparatus 2.

In an example, the communication apparatus 800 may perform the method 100 in the foregoing embodiment. When the communication apparatus 800 is configured to perform the method 100 in the foregoing embodiment, the communication apparatus 800 is equivalent to the communication apparatus 2 in the method 100. The communication interface 801 is configured to perform a receiving/sending operation performed by the communication apparatus 2 in the method 100. The processor 802 is configured to perform an operation other than the receiving/sending operation performed by the communication apparatus 2 in the method 100. For example, the communication interface 801 is configured to receive adjacency topology information 1 sent by a communication apparatus 1; and the processor 802 is configured to establish a tunnel 1 between the communication apparatus 1 and the communication apparatus 2 when the adjacency topology information 1 matches adjacency topology information 2 of the communication apparatus 2.

In an example, the communication apparatus 800 may perform the method 200 in the foregoing embodiment. When the communication apparatus 800 is configured to perform the method 200 in the foregoing embodiment, the communication apparatus 800 is equivalent to the first communication apparatus in the method 200. The communication interface 801 is configured to perform a receiving/sending operation performed by the first communication apparatus in the method 200. The processor 802 is configured to perform an operation other than the receiving/sending operation performed by the first communication apparatus in the method 200. For example, the communication interface 801 is configured to receive first adjacency topology information sent by a second communication apparatus; and the processor 802 is configured to establish a first tunnel between the first communication apparatus and the second communication apparatus when the first adjacency topology information matches second adjacency topology information of the first communication apparatus.

In an example, the communication apparatus 800 may perform the method 300 in the foregoing embodiment. When the communication apparatus 800 is configured to perform the method 300 in the foregoing embodiment, the communication apparatus 800 is equivalent to the second communication apparatus in the method 300. The communication interface 801 is configured to perform a receiving/sending operation performed by the second communication apparatus in the method 300. The processor 802 is configured to perform an operation other than the receiving/sending operation performed by the second communication apparatus in the method 300. For example, the processor 802 is configured to obtain first adjacency topology information of the second communication apparatus; and the communication interface 801 is configured to send the first adjacency topology information to a first communication apparatus.

Figure 9:
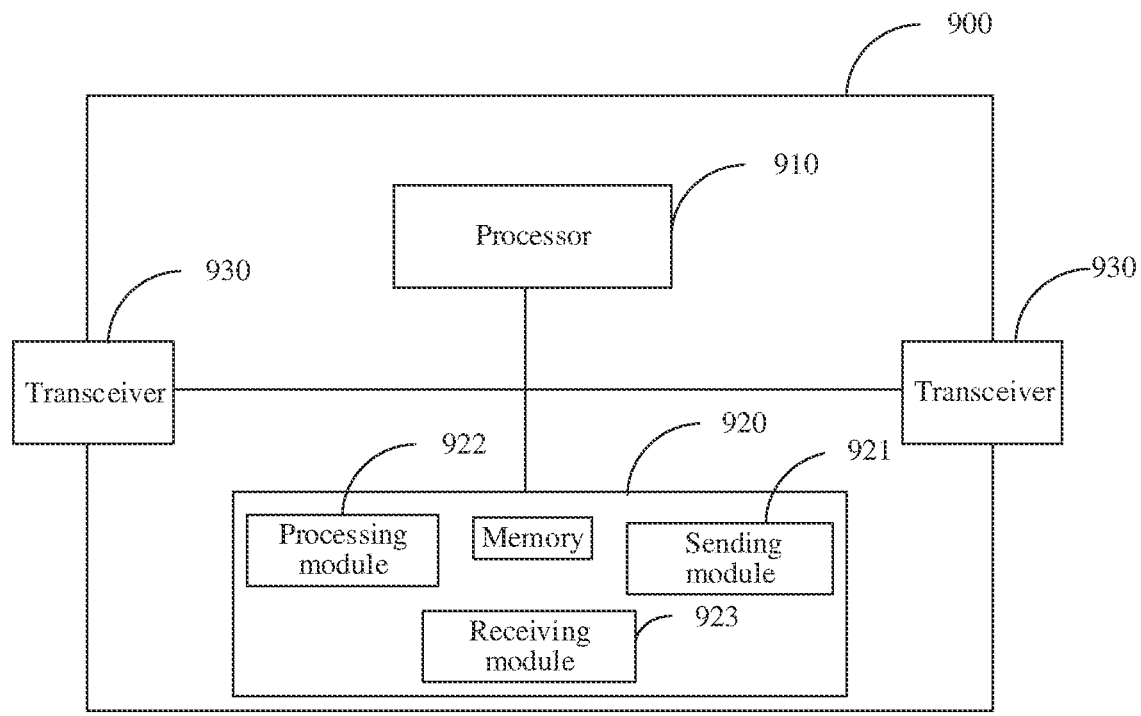
FIG. 9 is a schematic diagram of a structure of a communication apparatus according to an embodiment of this application.

In addition, an embodiment of this application further provides a communication apparatus 900. FIG. 9 is a schematic diagram of a structure of a communication apparatus according to an embodiment of this application. The communication apparatus 900 may be configured to perform the method 100, the method 200, or the method 300 in the foregoing embodiment.

As shown in FIG. 9, the communication apparatus 900 may include a processor 910, a 5 memory 920 coupled to the processor 910, and a transceiver 930. The transceiver 930 may be, for example, a communication interface, an optical module, or the like. The processor 910 may be a central processing unit (English: central processing unit, CPU for short), a network processor (English: network processor, NP for short), or a combination of a CPU and an NP. Alternatively, the processor may be an application-specific integrated circuit (English: application-specific integrated circuit, ASIC for short), a programmable logic device (English: programmable logic device, PLD for short), or a combination thereof. The PLD may be a complex programmable logic device (English: complex programmable logic device, CPLD for short), a field-programmable gate array (English: field-programmable gate array, FPGA for short), generic array logic (English: generic array logic, GAL for short), or any combination thereof. The processor 910 may be one processor, or may include a plurality of processors. The memory 920 may include a volatile memory (English: volatile memory) such as a random access memory (English: random access memory, RAM for short), or the memory may include a non-volatile memory (English: non-volatile memory) such as a read-only memory (English: read-only memory, ROM for short), a flash memory (English: flash memory), a hard disk drive (English: hard disk drive, HDD for short), or a solid-state drive (English: solid-state drive, SSD for short). Alternatively, the memory 920 may include a combination of the foregoing types of memories. The memory 920 may be one memory or may include a plurality of memories. In an implementation, the memory 920 stores computer-readable instructions, and the computer-readable instructions include a plurality of software modules, for example, a sending module 921, a processing module 922, and a receiving module 923. After executing each software module, the processor 910 may perform a corresponding operation according to an indication of each software module. In this embodiment, an operation performed by a software module is actually an operation performed by the processor 910 according to an indication of the software module.

In an example, the communication apparatus 900 may perform the method 100 in the foregoing embodiment. When the communication apparatus 900 is configured to perform the method 100 in the foregoing embodiment, the communication apparatus 900 is equivalent to the communication apparatus 1 in the method 100. The transceiver 930 is configured to perform a receiving/sending operation performed by the communication apparatus 1 in the method 100. The processor 910 is configured to perform an operation other than the receiving/sending operation performed by the communication apparatus 1 in the method 100. For example, the processor 910 is configured to obtain adjacency topology information 1 of the communication apparatus 1; and the transceiver 930 is configured to send the adjacency topology information 1 to a communication apparatus 2.

In an example, the communication apparatus 900 may perform the method 100 in the foregoing embodiment. When the communication apparatus 900 is configured to perform the method 100 in the foregoing embodiment, the communication apparatus 900 is equivalent to the communication apparatus 2 in the method 100. The transceiver 930 is configured to perform a receiving/sending operation performed by the communication apparatus 2 in the method 100. The processor 910 is configured to perform an operation other than the receiving/sending operation performed by the communication apparatus 2 in the method 100. For example, the transceiver 930 is configured to receive adjacency topology information 1 sent by a communication apparatus 1; and the processor 910 is configured to establish a tunnel 1 between the communication apparatus 1 and the communication apparatus 2 when the adjacency topology information 1 matches adjacency topology information 2 of the communication apparatus 2.

In an example, the communication apparatus 900 may perform the method 200 in the foregoing embodiment. When the communication apparatus 900 is configured to perform the method 200 in the foregoing embodiment, the communication apparatus 900 is equivalent to the first communication apparatus in the method 200. The transceiver 930 is configured to perform a receiving/sending operation performed by the first communication apparatus in the method 200. The processor 910 is configured to perform an operation other than the receiving/sending operation performed by the first communication apparatus in the method 200. For example, the transceiver 930 is configured to receive first adjacency topology information sent by a second communication apparatus; and the processor 910 is configured to establish a first tunnel between the first communication apparatus and the second communication apparatus when the first adjacency topology information matches second adjacency topology information of the first communication apparatus.

In an example, the communication apparatus 900 may perform the method 300 in the foregoing embodiment. When the communication apparatus 900 is configured to perform the method 300 in the foregoing embodiment, the communication apparatus 900 is equivalent to the second communication apparatus in the method 300. The transceiver 930 is configured to perform a receiving/sending operation performed by the second communication apparatus in the method 300. The processor 910 is configured to perform an operation other than the receiving/sending operation performed by the second communication apparatus in the method 300. For example, the processor 910 is configured to obtain first adjacency topology information of the second communication apparatus; and the transceiver 930 is configured to send the first adjacency topology information to a first communication apparatus.

This application further provides a computer-readable storage medium. The computer-readable storage medium stores instructions. When the instructions are run on a computer, the computer is enabled to perform any one or more operations in the method (for example, the method 100, the method 200, or the method 300) described in the foregoing embodiment.

This application further provides a computer program product, including a computer program. When the computer program product runs on a computer, the computer is enabled to perform any one or more operations in the method (for example, the method 100, the method 200, or the method 300) described in the foregoing embodiment.

This application further provides a communication system, including the communication apparatus 1 and the communication apparatus 2 mentioned in the method 100 in the foregoing embodiment.

This application further provides a communication system, including the first communication apparatus in the method 200 and the second communication apparatus in the method 300 in the foregoing embodiments.

This application further provides a communication system, including at least one memory and at least one processor. The at least one memory stores instructions, and the at least one processor executes the instructions, so that the communication system performs any one or more operations in the method (for example, the method 100, the method 200, or the method 300) in any one of the foregoing embodiments of this application.

In the specification, claims, and accompanying drawings of this application, the terms "first", "second", "third", "fourth", and the like (if existent) are intended to distinguish between similar objects but do not necessarily indicate a specific order or sequence. It should be understood that the data used in such a way are interchangeable in appropriate circumstances so that the embodiments described herein can be implemented in other orders than the order illustrated or described herein. In addition, the terms "include", "have", and any variants thereof are intended to cover non-exclusive inclusion. For example, a process, method, system, product, or device including a series of steps or units is not necessarily limited to those clearly listed steps or units, but may include other steps or units that are not clearly listed or are inherent to the process, method, product, or device.

It may be clearly understood by a person skilled in the art that, for the purpose of convenient and brief description, for a detailed working process of the foregoing described system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, division into the units is merely logical service division. In actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The units described as separate parts may or may not be physically separate, and parts displayed as units may or may not be physical units, may be located in one place, or may be distributed on a plurality of network units. Some or all of the units may be selected according to an actual requirement to achieve the objectives of the solutions in the embodiments.

In addition, service units in embodiments of this application may be integrated into one processing unit, or each unit may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

A person skilled in the art should be aware that in the foregoing one or more examples, services described in the present invention may be implemented by hardware, software, firmware, or any combination thereof. When implemented by software, these services may be stored in a computer-readable medium or transmitted as one or more instructions or code on the computer-readable medium. The computer-readable medium includes a computer storage medium and a communication medium. The communication medium includes any medium that facilitates transfer of a computer program from one place to another. The storage medium may be any usable medium accessible to a general-purpose or dedicated computer.

The objectives, technical solutions, and beneficial effects of the present invention are further described in detail in the foregoing specific implementations. It should be understood that the foregoing is merely specific implementations of the present invention.

The foregoing embodiments are merely used to describe the technical solutions of this application, but not to limit the technical solutions. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A first communication apparatus, comprising:
   at least one processor; and
   a non-transitory computer-readable storage medium storing a program to be executed by the at least one processor, the program including instructions to:
      receive first adjacency topology information sent by a second communication apparatus; and establish a first tunnel between the first communication apparatus and the second communication apparatus when the first adjacency topology information matches second adjacency topology information of the first communication apparatus, wherein the first adjacency topology information comprises a first adjacency type and a first adjacency identifier (ID), and the second adjacency topology information comprises a second adjacency type and a second adjacency ID, wherein a meaning of each adjacency ID is determined based on its corresponding adjacency type, and wherein the first adjacency type and the first adjacency ID indicate a tunnel establishment intention of the second communication apparatus.

2. The first communication apparatus according to claim 1, wherein the instructions to receive the first adjacency topology information sent by the second communication apparatus further comprise instructions to:

receive a first control packet sent by the second communication apparatus, wherein the first control packet comprises the first adjacency topology information.

3. The first communication apparatus according to claim 2, wherein the first control packet advertises a first border gateway protocol ethernet virtual private network (BGP EVPN) route.

4. The first communication apparatus according to claim 1, wherein the first adjacency topology information matches the second adjacency topology information of the first communication apparatus when the first adjacency type is the same as the second adjacency type and the first adjacency ID is the same as the second adjacency ID.

5. The first communication apparatus according to claim 4, wherein the first adjacency type comprises any one of point-to-point, point-to-multipoint, or full mesh.

6. The first communication apparatus according to claim 5, wherein one of:

the first adjacency type is point-to-point or full mesh, and the first adjacency ID indicates to the first communication apparatus to establish a point-to-point tunnel between the first communication apparatus and a communication apparatus whose corresponding adjacency type is the first adjacency type and whose corresponding adjacency ID is the first adjacency ID; or based on the first adjacency type being point-to-point, the first adjacency ID indicates a point-to-point connection between the first communication apparatus and another communication apparatus; or based on the first adjacency type being full mesh, the first adjacency ID indicates a full mesh network in which the first communication apparatus is located.

7. The first communication apparatus according to claim 5, wherein the first adjacency type is point-to-multipoint, and the first adjacency ID indicates to the first communication apparatus to establish a point-to-point tunnel between a spoke node and a hub node.

8. The first communication apparatus according to claim 7, wherein the first communication apparatus is the hub node, and the second communication apparatus is the spoke node; or wherein the first communication apparatus is the spoke node, and the second communication apparatus is the hub node.

9. The first communication apparatus according to claim 7, wherein the first adjacency ID identifies the hub node.

10. The first communication apparatus according to claim 1, wherein the instructions further include instructions to:

receive third adjacency topology information sent by a third communication apparatus; and establish a second tunnel between the first communication apparatus and the third communication apparatus when the third adjacency topology information matches the second adjacency topology information.

11. The first communication apparatus according to claim 1, wherein the instructions further include instructions to:

send the second adjacency topology information to the second communication apparatus.

12. A second communication apparatus, comprising:

at least one processor; and a non-transitory computer-readable storage medium storing a program to be executed by the at least one processor, the program including instructions to:

obtain first adjacency topology information of the second communication apparatus;

send the first adjacency topology information to a first communication apparatus;

receive second adjacency topology information sent by the first communication apparatus; and establish a tunnel between the first communication apparatus and the second communication apparatus based on the first adjacency topology information matching the second adjacency topology information, wherein the first adjacency topology information and the second adjacency topology information each comprise an adjacency type and an adjacency identifier (ID), wherein a meaning of each adjacency ID is determined based on its corresponding adjacency type, and wherein the adjacency type of the first adjacency topology information and the adjacency ID of the first adjacency topology information indicates a tunnel establishment intention of the second communication apparatus.

13. The second communication apparatus according to claim 12, wherein obtaining the first adjacency topology information of the second communication apparatus comprises:

obtaining the first adjacency topology information preconfigured on the second communication apparatus locally.

14. The second communication apparatus according to claim 12, wherein obtaining the first adjacency topology information of the second communication apparatus comprises:

receiving the first adjacency topology information sent by a controller.

15. The second communication apparatus according to claim 12, wherein the instructions further include instructions to:

send a first control packet to the first communication apparatus, wherein the first control packet comprises the first adjacency topology information.

16. The second communication apparatus according to claim 15, wherein the first control packet advertises a first border gateway protocol ethernet virtual private network (BGP EVPN) route.

17. The second communication apparatus according to claim 12, wherein the first adjacency topology information matches the second adjacency topology information of the first communication apparatus when the adjacency type of the first adjacency topology information is the same as an adjacency type of the second adjacency topology information and the adjacency ID of the first adjacency topology information is the same as an adjacency ID of the second adjacency topology information.

18. The second communication apparatus according to claim 17, wherein the adjacency type of the first adjacency topology information and the adjacency type of the second adjacency topology information comprise any one of point-to-point, point-to-multipoint, or full mesh.

19. The second communication apparatus according to claim 18, wherein the adjacency type of the first adjacency topology information is point-to-multipoint, and the adjacency ID of the first adjacency topology information indicates to the second communication apparatus to establish a point-to-point tunnel between a spoke node and a hub node.

20. The second communication apparatus according to claim 19, wherein the first communication apparatus is the hub node, and the second communication apparatus is the spoke node; or
   wherein the first communication apparatus is the spoke node, and the second communication apparatus is the hub node.

* * * * *